US012632261B2

(12) United States Patent
Shulyak et al.

(10) Patent No.: US 12,632,261 B2
(45) Date of Patent: May 19, 2026

(54) SELECTING A CANDIDATE CONSUMER INSTRUCTION BASED ON AN OBSERVED INSTRUCTION HAVING A DEPENDENCY MARKED SOURCE OPERAND FROM PRODUCER DATA OF A PRODUCER INSTRUCTION

(71) Applicant: Arm Limited, Cambridge (GB)

(72) Inventors: Alexander Cole Shulyak, Austin, TX (US); Devin S Lafford, Austin, TX (US); Scott Courtland Hadley, Austin, TX (US); William James McAvoy, Raleigh, NC (US); Brian Michael Stempel, Raleigh, NC (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/817,355

(22) Filed: Aug. 28, 2024

(65) Prior Publication Data

US 2026/0064424 A1 Mar. 5, 2026

(51) Int. Cl.
*G06F 9/38* (2018.01)

(52) U.S. Cl.
CPC .................................. *G06F 9/3838* (2013.01)

(58) Field of Classification Search
CPC ...................................................... G06F 9/3838
See application file for complete search history.

(56) References Cited

U.S. PATENT DOCUMENTS

| | | | | |
|---|---|---|---|---|
| 5,761,474 | A | 6/1998 | Lesartre et al. | |
| 7,234,044 | B1 * | 6/2007 | Perry ................... | G06F 9/30094 |
| | | | | 712/228 |
| 7,725,513 | B2 * | 5/2010 | Zabarski ............... | G06F 9/3001 |
| | | | | 708/207 |
| 9,973,187 | B1 | 5/2018 | Pant | |
| 11,327,763 | B2 | 5/2022 | Perais | |
| 11,442,863 | B2 | 9/2022 | Shulyak et al. | |
| 12,045,170 | B2 | 7/2024 | Shulyak et al. | |
| 2010/0306509 | A1 * | 12/2010 | Day ...................... | G06F 9/3861 |
| | | | | 712/217 |
| 2012/0278596 | A1 * | 11/2012 | Tran ...................... | G06F 9/3851 |
| | | | | 712/228 |

(Continued)

OTHER PUBLICATIONS

U.S. Appl. No. 18/817,723, filed Aug. 28, 2024, Mcavoy et al.

(Continued)

*Primary Examiner* — Shawn Doman
(74) *Attorney, Agent, or Firm* — NIXON & VANDERHYE P.C.

(57) ABSTRACT

A relationship table stores a plurality of producer-consumer relationships defining associations between producers and consumers, wherein a source operand of a consumer is generated in dependence on producer data resulting from the producer. A candidate producer is selected and, based on subsequent candidate consumers, a candidate producer-consumer relationship is established and stored in the relationship table. A dependency marker is set in association with the producer data and a set dependency marker is propagated so as to be associated with result data values generated in data processing operations in dependence on the producer data. Candidate consumers are selected when they have at least one source operand that has a set dependency marker.

19 Claims, 15 Drawing Sheets

(56) References Cited

U.S. PATENT DOCUMENTS

| | | | | |
|---|---|---|---|---|
| 2013/0318330 | A1 | 11/2013 | Alexander | |
| 2014/0281402 | A1* | 9/2014 | Comparan | G06F 9/3842 |
| | | | | 712/214 |
| 2015/0089190 | A1* | 3/2015 | Gonion | G06F 9/3838 |
| | | | | 712/7 |
| 2015/0089191 | A1* | 3/2015 | Gonion | G06F 9/3838 |
| | | | | 712/7 |
| 2016/0378480 | A1* | 12/2016 | Matveyev | G06F 9/30105 |
| | | | | 712/208 |
| 2017/0091104 | A1* | 3/2017 | Rafacz | G06F 12/0862 |
| 2019/0087521 | A1 | 3/2019 | Haskins, Jr. | |
| 2020/0409712 | A1 | 12/2020 | Clancy | |
| 2021/0089312 | A1* | 3/2021 | Kothinti Naresh | G06F 9/3867 |
| 2021/0096861 | A1 | 4/2021 | Wang | |
| 2021/0124585 | A1* | 4/2021 | Grubisic | G06F 9/3867 |
| 2021/0389951 | A1 | 12/2021 | Perais et al. | |
| 2022/0237478 | A1* | 7/2022 | Lafford | G06N 5/04 |
| 2022/0391214 | A1 | 12/2022 | Eyole et al. | |
| 2023/0176973 | A1* | 6/2023 | Shulyak | G06N 20/00 |
| | | | | 711/118 |
| 2023/0229596 | A1* | 7/2023 | Shulyak | G06F 12/0862 |
| | | | | 711/137 |
| 2023/0315446 | A1* | 10/2023 | Oshiyama | G06F 9/3867 |
| | | | | 712/221 |

OTHER PUBLICATIONS

Office Action dated Oct. 1, 2025 for U.S. Appl. No. 18/817,723, 30 pages.
Search Report for GB Application No. 2511342.4 dated Dec. 18, 2025, 5 pages.
Search Report for GB Application No. 2510859.8 dated Dec. 15, 2025, 5 pages.

\* cited by examiner

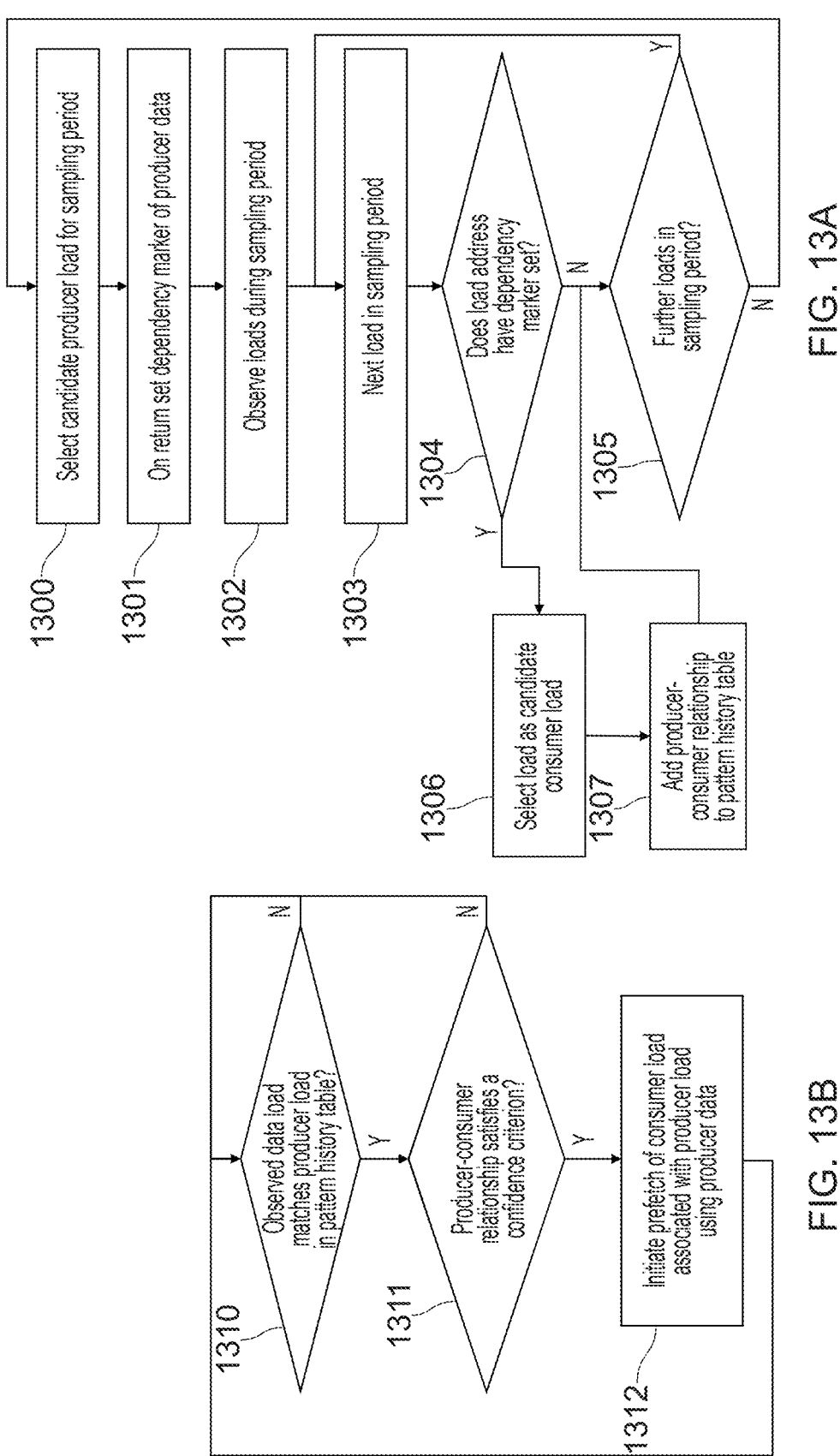

1300 Select candidate producer load for sampling period

1301 On return set dependency marker of producer data

1302 Observe loads during sampling period

1303 Next load in sampling period

1304 Does load address have dependency marker set?

Y

N

1305 Further loads in sampling period?

Y

N

1306 Select load as candidate consumer load

1307 Add producer-consumer relationship to pattern history table

FIG. 13A

1310 Observed data load matches producer load in pattern history table?

N

Y

1311 Producer-consumer relationship satisfies a confidence criterion?

N

Y

1312 Initiate prefetch of consumer load associated with producer load using producer data

FIG. 13B

SELECTING A CANDIDATE CONSUMER INSTRUCTION BASED ON AN OBSERVED INSTRUCTION HAVING A DEPENDENCY MARKED SOURCE OPERAND FROM PRODUCER DATA OF A PRODUCER INSTRUCTION

TECHNICAL FIELD

The present disclosure relates to data processing.

DESCRIPTION

A data processing apparatus may perform data processing operations by executing instructions. Amongst the many instructions that the data processing apparatus executes there may be a producer-consumer relationship between a producer instruction and a consumer instruction, whereby a consumer instruction source operand is generated in dependence on producer data resulting from the producer instruction.

SUMMARY

In one example embodiment described herein there is a data processing apparatus comprising:

processing circuitry to perform data processing operations by executing instructions;

a relationship table to store a plurality of producer-consumer relationships, each producer-consumer relationship defining an association between a producer instruction and at least one consumer instruction, wherein a source operand of the at least one consumer instruction is generated in dependence on producer data resulting from the producer instruction;

training circuitry to select a candidate producer instruction and to evaluate a candidate producer-consumer relationship between the candidate producer instruction and subsequent candidate consumer instructions in a plurality of observed instructions and to cause the candidate producer-consumer relationship to be stored in the relationship table; and dependency tracking circuitry responsive to provision of the producer data to set a dependency marker associated with the producer data and wherein the processing circuitry is configured to propagate the dependency marker that is set to be associated with result data values generated in the data processing operations in dependence on the producer data, wherein the training circuitry is configured to select for the subsequent candidate consumer instructions an observed instruction for which at least one source operand has the dependency marker that is set.

In one example embodiment described herein there is a system comprising:

the apparatus of the above-mentioned example embodiment, implemented in at least one packaged chip;

at least one system component; and a board, wherein the at least one packaged chip and the at least one system component are assembled on the board.

In one example embodiment described herein there is a chip-containing product comprising the system of the above-mentioned example embodiment assembled on a further board with at least one other product component.

In one example embodiment described herein there is a method of data processing comprising:

performing data processing operations by executing instructions;

storing in a relationship table a plurality of producer-consumer relationships, each producer-consumer relationship defining an association between a producer instruction and at least one consumer instruction, wherein a source operand of the at least one consumer instruction is generated in dependence on producer data resulting from the producer instruction;

selecting a candidate producer instruction;

evaluating a candidate producer-consumer relationship between the candidate producer instruction and subsequent candidate consumer instructions in a plurality of observed instructions and causing the candidate producer-consumer relationship to be stored in the relationship table;

in response to provision of the producer data setting a dependency marker associated with the producer data;

propagating the dependency marker that is set to be associated with result data values generated in the data processing operations in dependence on the producer data; and selecting for the subsequent candidate consumer an observed instruction for which at least one source operand has the dependency marker that is set.

BRIEF DESCRIPTION OF THE DRAWINGS

The present invention will be described further, by way of example only, with reference to embodiments thereof as illustrated in the accompanying drawings, in which:

FIG. 13A is a flow diagram schematically illustrating a sequence of steps that are taken in a method in accordance with some examples;

FIG. 13B is a flow diagram schematically illustrating a sequence of steps that are taken in a method in accordance with some examples;

DESCRIPTION OF EXAMPLE EMBODIMENTS

Figure 1:
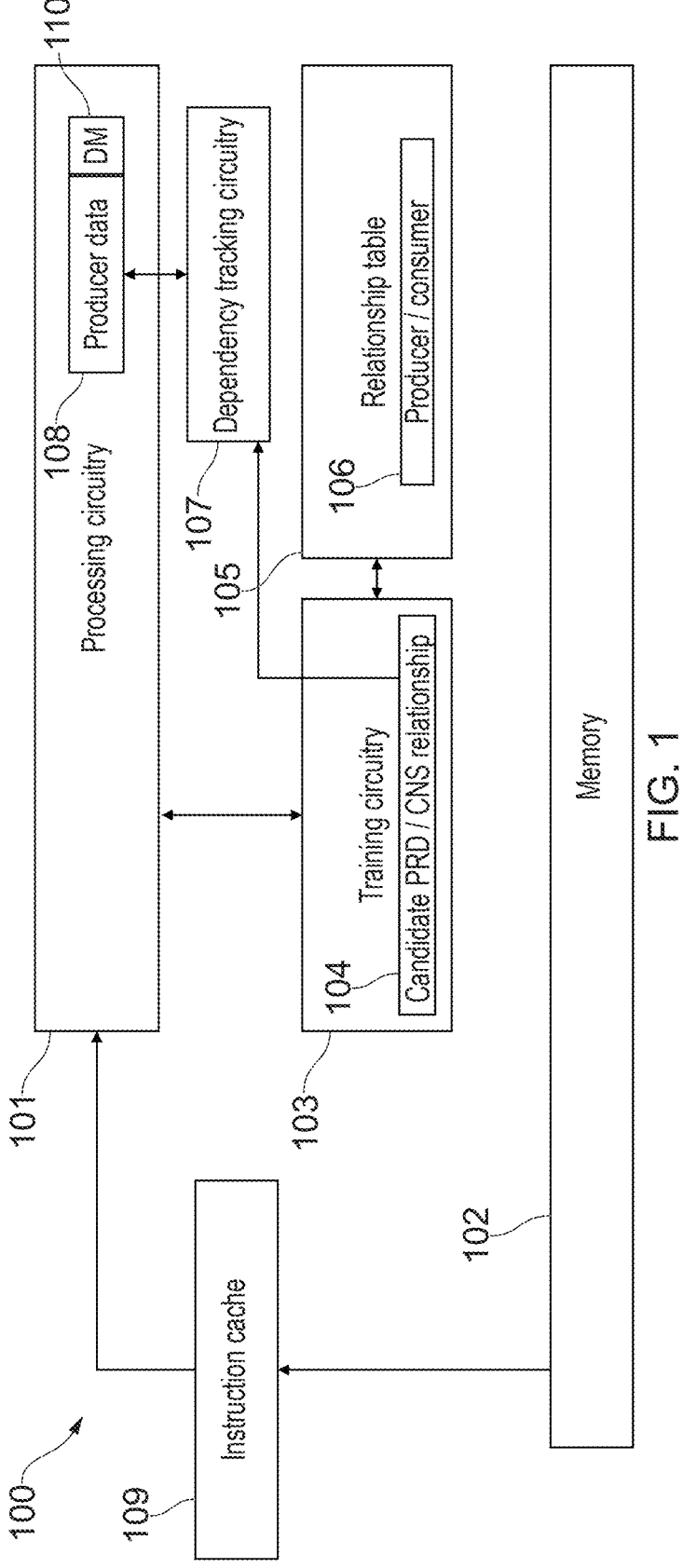
FIG. 1 schematically illustrates a data processing apparatus in accordance with some examples.

Before discussing the embodiments with reference to the accompanying figures, the following description of embodiments is provided.

In accordance with one example configuration there is provided a data processing apparatus comprising:

processing circuitry to perform data processing operations by executing instructions;

a relationship table to store a plurality of producer-consumer relationships, each producer-consumer relationship defining an association between a producer instruction and at least one consumer instruction, wherein a source operand of the at least one consumer instruction is generated in dependence on producer data resulting from the producer instruction;

training circuitry to select a candidate producer instruction and to evaluate a candidate producer-consumer relationship between the candidate producer instruction and subsequent candidate consumer instructions in a plurality of observed instructions and to cause the candidate producer-consumer relationship to be stored in the relationship table; and dependency tracking circuitry responsive to provision of the producer data to set a dependency marker associated with the producer data and wherein the processing circuitry is configured to propagate the dependency marker that is set to be associated with result data values generated in the data processing operations in dependence on the producer data, wherein the training circuitry is configured to select for the subsequent candidate consumer instructions an observed instruction for which at least one source operand has the dependency marker that is set.

The data processing apparatus is configured to perform data processing operations by executing instructions. Amongst the many instructions that the data processing apparatus executes there may be a producer-consumer relationship between a producer instruction and a consumer instruction, whereby a consumer instruction source operand is generated in dependence on producer data resulting from the producer instruction. It may be useful to identify this relationship for a number of reasons, often related to improving the data processing efficiency of the data processing apparatus. Where the consumer instruction source operand depends on producer data resulting from the producer instruction, it will be understood that execution of that consumer instruction cannot begin until that producer data is available. In order to identify producer-consumer relationships, the data processing apparatus is provided with training circuitry that is configured to select a candidate producer instruction and to evaluate a candidate producer-consumer relationship between the candidate producer instruction and subsequent candidate consumer instructions in a plurality of observed instructions. However, it may not be feasible to assess every subsequent instruction in the plurality of observed instructions to determine if it is indeed a consumer instruction that has a producer-consumer relationship with the candidate producer instruction. Additionally, the selection of suitable candidate consumer instructions may be made more difficult by the fact that the producer-consumer relationship may not be direct, i.e. producer data resulting from the producer instruction may not itself be the consumer instruction source operand. The dependency may be indirect and indeed with varying levels of complexity, e.g. the consumer instruction source operand may be generated on the basis of other data values, which themselves have undergone some data processing steps, and those other data values may only depend in some indirect way on the producer data. In order to address this, the data processing apparatus is provided with dependency tracking circuitry, which is responsive to the provision of the producer data to set a dependency marker associated with the producer data. This set dependency marker is then caused to be propagated by the processing circuitry of the data processing apparatus as it performs data processing operations, such that the set dependency marker is associated with result data values generated in the data processing operations in dependence on the producer data. Then, when determining which observed instructions to select as the subsequent candidate consumer instructions, this is done by selecting observed instructions for which at least one source operand has the dependency marker that is set. The dependency marker thus provides a technique for tracking the dependency from the producer data to a subsequent consumer instruction source operand.

The identified and tracked producer-consumer relationships can be used in various ways either to seek to improve performance of the data processing apparatus, such as in a prefetcher where a prefetch for a consumer load may be able to be initiated sooner and thus the latency associated with performance of the prefetch for the consumer load may be reduced. In other examples, these techniques may support improvement of branch prediction techniques, e.g. identifying which loads tend to cause branch mispredicts. In such examples a producer load is feeding (directly or indirectly) a consumer branch. In yet other examples, these techniques may support improvement of register caching/partitioning, where it may be desirable to steer dependent instructions to specific clusters of pipelines.

The training circuitry may be configured in a variety of ways, but in some examples the training circuitry comprises a training table with multiple entries and an entry of the training table holds an indication of the candidate producer instruction, and the training circuitry is configured to select for each entry of the multiple entries a respective candidate producer instruction and to evaluate a respective candidate producer-consumer relationship between the respective candidate producer instruction and subsequent respective candidate consumer instructions in the plurality of observed instructions. Accordingly the training circuitry can then hold a candidate producer instruction in each of the multiple entries and determine a respective producer-consumer relationship between each candidate producer instruction and the subsequent candidate consumer instructions in the plurality of observed instructions.

Whilst there might still only be a single dependency marker which can be set in association with the producer data values (such that when the dependency marker is propagated it is not possible to distinguish which producer instruction it is originally associated with), this may nonetheless provide a sufficiently useful filter in the selection of subsequent candidate consumer instructions. However in some examples, the dependency marker is a respective dependency marker of multiple dependency markers in a dependency vector associated with the producer data, the dependency vector corresponding to the multiple entries of the training table. The multiple dependency markers thus allow that distinction to be made between the multiple candidate producer instructions.

The processing circuitry may be configured to propagate a set dependency marker in a variety of ways through the data processing operations, but in some examples the processing circuitry is configured, when executing an instruction as part of the executing instructions, to generate the dependency marker for a result value as an OR function of the dependency markers for source operands of the instruction. More particularly, when the dependency markers are more than single bit values, this OR function can be implemented as a bitwise OR function such that the independence of those multiple bits of a given dependency marker is maintained. In some examples the processing circuitry is configured, when executing an instruction as part of the executing instructions, to generate the dependency marker for a result value as an XOR function of the dependency markers for source operands of the instruction, this meaning that when both (or all if appropriate) input operands have their dependency markers set, the dependency chain is intentionally broken. Avoiding such non-linear dependency chains may be desirable.

The candidate producer instruction may be selected in a variety of ways. In some examples the training circuitry is configured to select the candidate producer instruction from a plurality of observed instructions in a sampling period and is configured to select the observed instruction for which at least one source operand has the dependency marker that is set in the sampling period.

The general principle of the dependency marker is to track producer-consumer relationships that have been identified during the sampling period. As such, the dependency marker indicates a data dependency on the producer data of the source operands of the candidate consumer instructions observed in that sampling period. In examples in which it is considered to be important that the dependencies marked have strictly only been identified during that sampling period, the dependency marker (wherever it has propagated to) may be cleared before a new sampling period starts. However it is also recognised here that there will be a natural "decay" of dependencies with time elapsed (i.e. with instructions encountered) following a given candidate producer instruction. Consequently in some examples the further cost of explicitly clearing the dependency marker between sampling periods may be dispensed with. Nevertheless in some examples such clearing may be performed.

Accordingly, in some examples the training circuitry is configured, after the sampling period, to commence a new sampling period without causing the dependency marker to be cleared. Equally, in some examples the training circuitry is configured, after the sampling period, to cause the dependency marker to be cleared before commencing a new sampling period.

In some examples there are multiple dependency markers that can be set, whereby each of the multiple dependency markers corresponds to a different sampling period. Accordingly, in some examples the dependency marker is a sequence dependency marker of multiple sequence dependency markers associated with the producer data, wherein the sequence dependency marker is associated with the sampling period and a subsequent sequence dependency marker of the multiple sequence dependency markers is associated with a subsequent sampling period.

In some examples, the training circuitry is configured to select as the candidate producer instruction a predetermined type of instruction and is configured to select the observed instruction for which at least one source operand has the dependency marker that is set from a set of observed instructions that follows the candidate producer instruction.

The producer instruction and the at least one consumer instruction may generally be any kind of instruction and the dependence of a source operand of the at least one consumer instruction on the producer data may take a corresponding wide range of forms. However, in some examples the producer instruction is a producer load instruction and the at least one consumer instruction is at least one consumer load instruction, wherein a load address of the at least one consumer load instruction is generated in dependence on the producer data retrieved by the producer load instruction. The use of the present techniques in the context of load instructions may be of particular benefit, given the latency associated with retrieval of a data value from a memory system for a load.

In some examples, the data processing apparatus further comprises: a cache to store local copies of data items for use in the data processing operations; and prefetch circuitry to initiate a prefetch of data for storage in the cache and, when an observed data load matches the producer load of an identified producer-consumer relationship in the relationship table, to initiate the prefetch for the at least one consumer load in dependence on the identified producer-consumer relationship and the producer data from the observed data load to return respective consumer data for storage in the data cache. The identified producer-consumer relationship can thus enable a prefetch for the at least one consumer load to be initiated sooner and thus the latency associated with performance of the prefetch for the at least one consumer load may be reduced.

In some examples, a confidence value is associated with each producer-consumer relationship stored in the relationship table, wherein the training circuitry is configured to update the confidence value associated with each said producer-consumer relationship in iterations over multiple sampling periods, and wherein initiation of the prefetch for the at least one consumer load in dependence on the identified producer-consumer relationship requires the confidence value associated with the identified producer-consumer relationship to meet a threshold value. Accordingly, a more reliable prediction mechanism can be established.

A data processing apparatus may be provided with a store buffer, for example as part of a load/store unit, and the inventors of the present techniques have further realised in the context of the present techniques that when store-to-load-forwarding is supported it can be beneficial for the propagation of the dependency marker to include propagation through store-to-load-forwarding. Accordingly in some examples the data processing apparatus further comprises a store buffer to hold queued data values generated in the data processing operations before the queued data values are passed to a memory system, wherein propagation of the dependency marker further comprises associating the dependency marker with a queued data value held in the store buffer and, when the queued data value becomes a loaded data value via store-to-load-forwarding, propagating the dependency marker to the loaded data value.

Accordingly, whilst in some examples the propagation of the dependency markers does not penetrate the memory system, this is an example of where the propagation need not completely be excluded from all loads, since here the store-to-load-forwarding enables the propagation into the load data. Moreover, other examples will allow this propagation of the dependency markers into the memory system (e.g. the dependency markers are stored in one or more levels of data cache in association with the respective data values). In other examples, a side structure is used to track addresses with dependency bits set. This may support a more area efficient implementation, with the additional benefit that the entire structure can be cleared after a training period to avoid stale dependency markers. Alternative mechanisms may be provided for tracking the dependency information, such as through bits associated with each instruction associated with one or more stages of an execution pipeline. These can be complemented by state bits (such as one state bit per logical register) to cover larger gaps between instructions in a dependency chain as they flow through a pipeline.

The producer data on which a source operand of the at least one consumer instruction depends may take a variety of forms. However, in some examples the producer data comprises a pointer indicative of the load address of the at least one consumer load.

In some examples, the producer data comprises an array index. The use of an array index as the producer data on which a source operand of the at least one consumer instruction depends may be a useful technique in some programming contexts. However, this can also make more difficult the identification of consumer instructions for which a source operand depends on producer data resulting from a producer instruction, because of the indirection via the array into which the producer data indexes. In this context, the present techniques may be particularly beneficial in nevertheless allowing that dependency to be tracked.

The producer data and the source operands of the consumer instruction may be held in the data processing apparatus is a variety of ways. A register file configured to hold data values is a common arrangement. The registers of a register file may be used in various ways, but in some examples the data processing apparatus further comprises register storage associated with the processing circuitry, wherein registers of the register storage hold data values providing source operands of the instructions executed by the processing circuitry when performing the data processing operations, wherein the registers each have a predetermined data size, and wherein the data processing apparatus is configured to use the registers as packed registers, wherein multiple data values are held in one packed register, and wherein the dependency tracking circuitry is configured to cause the dependency marker associated with a packed register to be set when one of the multiple data values held in the packed register is a result data value generated in the data processing operations in dependence on the producer data.

In some examples, the dependency marker is a respective dependency marker of multiple dependency markers in a dependency vector associated with the producer data, the dependency vector corresponding to the multiple data values held in the packed register, wherein the dependency vector is associated with the packed register and the respective dependency markers of the multiple dependency markers correspond to the multiple data values held in the packed register.

In accordance with one example configuration there is provided a system comprising: the apparatus of any of the examples discussed above, implemented in at least one packaged chip; at least one system component; and a board, wherein the at least one packaged chip and the at least one system component are assembled on the board.

In accordance with one example configuration there is provided a chip-containing product comprising the above-mentioned system assembled on a further board with at least one other product component.

In accordance with one example configuration there is provided a method of data processing comprising:

performing data processing operations by executing instructions;

storing in a relationship table a plurality of producer-consumer relationships, each producer-consumer relationship defining an association between a producer instruction and at least one consumer instruction, wherein a source operand of the at least one consumer instruction is generated in dependence on producer data resulting from the producer instruction;

selecting a candidate producer instruction;

evaluating a candidate producer-consumer relationship between the candidate producer instruction and subsequent candidate consumer instructions in a plurality of observed instructions and causing the candidate producer-consumer relationship to be stored in the relationship table;

in response to provision of the producer data setting a dependency marker associated with the producer data;

propagating the dependency marker that is set to be associated with result data values generated in the data processing operations in dependence on the producer data; and selecting for the subsequent candidate consumer instructions an observed instruction for which at least one source operand has the dependency marker that is set.

In accordance with one example configuration there is provided the apparatus of any of the above discussed examples, wherein the processing circuitry comprising a 6×128 bit vector datapath.

Particular embodiments will now be described with reference to the figures.

FIG. 1 illustrates a data processing apparatus 100 in accordance with one embodiment. The apparatus comprises processing circuitry 101, which is arranged to perform data processing operations defined by a sequence of instructions. These instructions are stored in memory 102 and may be temporarily cached in instruction cache 109. In performing the data processing operations various producer-consumer relationships may be encountered, a producer-consumer relationship being an association between a producer instruction and at least one consumer instruction, wherein a source operand of the at least one consumer instruction is generated in dependence on producer data resulting from the producer instruction. Such a producer-consumer relationship may be relatively direct, such as when the producer data itself directly provides the source operand of the at least one consumer instruction. Other producer-consumer relationships may be considerably more indirect, such as when the producer data is involved in further data processing operations, possibly in multiple steps, which ultimately result in a data value which provides the source operand of the at least one consumer instruction. The apparatus 100 further comprises training circuitry 103, which is arranged to evaluate candidate producer-consumer relationships. For this purpose the training circuitry 103 selects a candidate producer instruction and subsequent candidate consumer instructions and evaluates each candidate producer-consumer relationship 104. An established producer-consumer relationship is caused to be stored as an entry 106 in a relationship table 105. The apparatus 100 also further comprises dependency tracking circuitry 107, which is arranged to monitor the progress of the execution of the candidate producer instruction and, in response to the provision of the producer data 108, to set a dependency marker 110 associated with the producer data. The producer data may for example be held in a register accessible to the processing circuitry 101. The processing circuitry 101 is configured to propagate the set dependency marker such that it is associated with result data values generated in the data processing operations in dependence on the producer data 108. Furthermore, in selecting the candidate consumer instructions the training circuitry 103 is arranged to select as the candidate consumer instructions those instructions for which at least one source operand have a set dependency marker. The candidate producer instruction can for example be selected in a sampling period (also see further discussion below referring to FIG. 4) with the subsequent candidate consumer instructions also being selected within that sampling period. The trigger to select the candidate producer instruction can also be a predetermined type of instruction, with the subsequent candidate consumer instructions also being selected within a set (e.g. fixed number) of observed instructions that follows the candidate producer instruction.

Figures 2A, 2B, 2C:
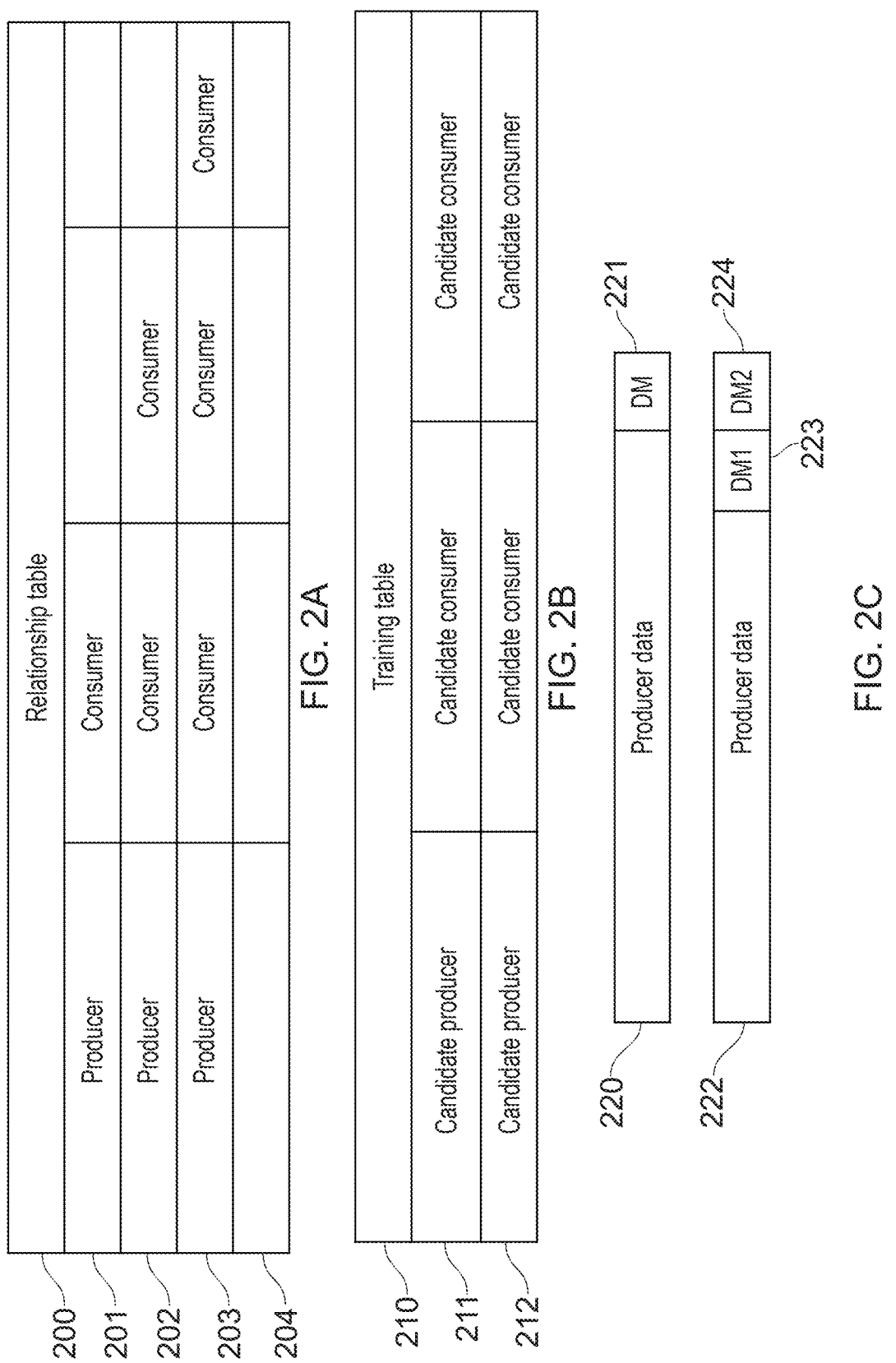
FIG. 2A schematically illustrates an example relationship table, FIG. 2B schematically illustrates an example training table, and FIG. 2C schematically illustrates example producer data in accordance with some examples.

FIG. 2A schematically illustrates an example relationship table 200, FIG. 2B schematically illustrates an example training table 210, and FIG. 2C schematically illustrates example producer data 220, 222 in accordance with some examples. The relationship table 200 is arranged to store a producer-consumer relationships. These may take the form shown in FIG. 2A where each entry 201, 202, 203, 204 of the relationship table 200 comprises an indication of a producer instruction and one or more consumer instruction indications. In the example entries shown in FIG. 2A: the entry 201 indicates a relationship between a producer instruction and a consumer instruction; the entry 202 indicates a relationship between a producer instruction and two consumer instructions; and the entry 203 indicates a relationship between a producer instruction and three consumer instructions. The number of consumer instructions that may be associated with a given producer instruction is not limited (other than by the storage capacity per entry of the table provided). In FIG. 2B the training table 210 comprises two entries 211, 212 each of which holds a candidate producer instruction and then, over the course of a sampling period (e.g. 1024 instructions, although the present techniques are not limited to any particular sampling period length), candidate consumer instructions are selected to form a possible producer-consumer relationship. Example producer data 220, 222 is shown, wherein producer data 220 only has a single associated dependency marker 221, and producer data 222 has two associated dependency markers 223, 224. In some implementations, the training table 210 may comprise only one entry for a candidate producer instruction. In such a case the single dependency marker 221 of producer data 220 can then correspond that that one entry. By contrast, in some implementations (such as that shown in FIG. 2B), the training table 210 comprises two entries 211, 212 each of which holds a candidate producer instruction. The two dependency markers 223, 224 of producer data 222 may then each correspond to a respective one of the two candidate producers in the two entries 211, 212. However, in some implementations the training table 210 may comprises the two entries 211, 212, and yet only the single dependency marker type of producer data 220 is used. This approach may be opted for when the use of the single dependency marker brings sufficient benefit in identifying candidate producer-consumer relationships, even though it does not allow distinction to be made between the respective candidate producer instructions in the two entries 211, 212 of the training table 210.

Figure 3:
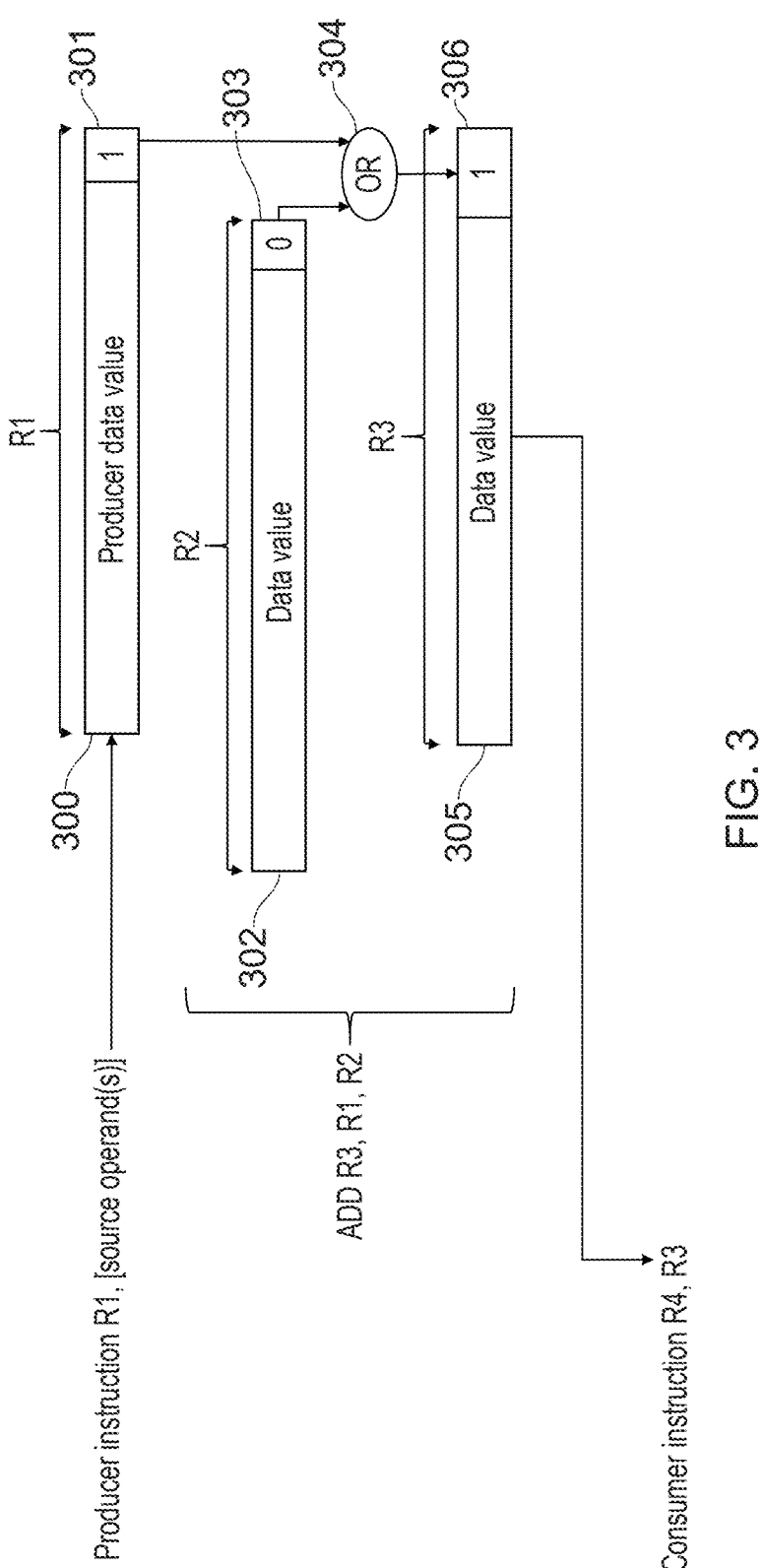
FIG. 3 schematically illustrates the propagation of a dependency marker in accordance with some examples.

FIG. 3 schematically illustrates the propagation of a dependency marker in accordance with some examples. The execution of a producer instruction (itself having one or more source operands) generates a producer data value 300, which is stored in a destination register R1 with its associated dependency marker 301. Since this is a candidate producer instruction, its associated dependency marker 301 is set. A subsequent instruction (not necessarily the sequentially next instruction) is configured to cause the values held in the source operand registers R1 and R2 to be added together with the result value being stored in the destination register R3. The data value 302 held in register R2 has an associated dependency marker 303, which is not set. The processing circuitry which carries out the addition operation also propagates the dependency markers, this being performed with the use of an OR function 304, which takes the dependency markers 301, 303 as its inputs. Thus in the illustrated example the output of the function 304 is the "set" value (shown as "1" in the figure). This then provides the associated dependency marker 306 that accompanies the data value 305 held in destination register R3. When the content of the register R3 then provides a source operand for a subsequent instruction, that instruction may then be selected as a candidate consumer instruction. It will be appreciated that for clarity of illustration FIG. 3 only shows an example of a single OR function 304, but the propagation of dependency markers may comprise many such steps. In addition, in an implementation with multiple dependency markers associated with each data value, the OR function can then be provided as a bitwise OR function such that the multiple dependency markers can be individually propagated. Alternatively an XOR function may be used, such that if both (or all if appropriate) input operands have their dependency markers set, the dependency chain is intentionally broken due to its nonlinearity.

Figure 4:
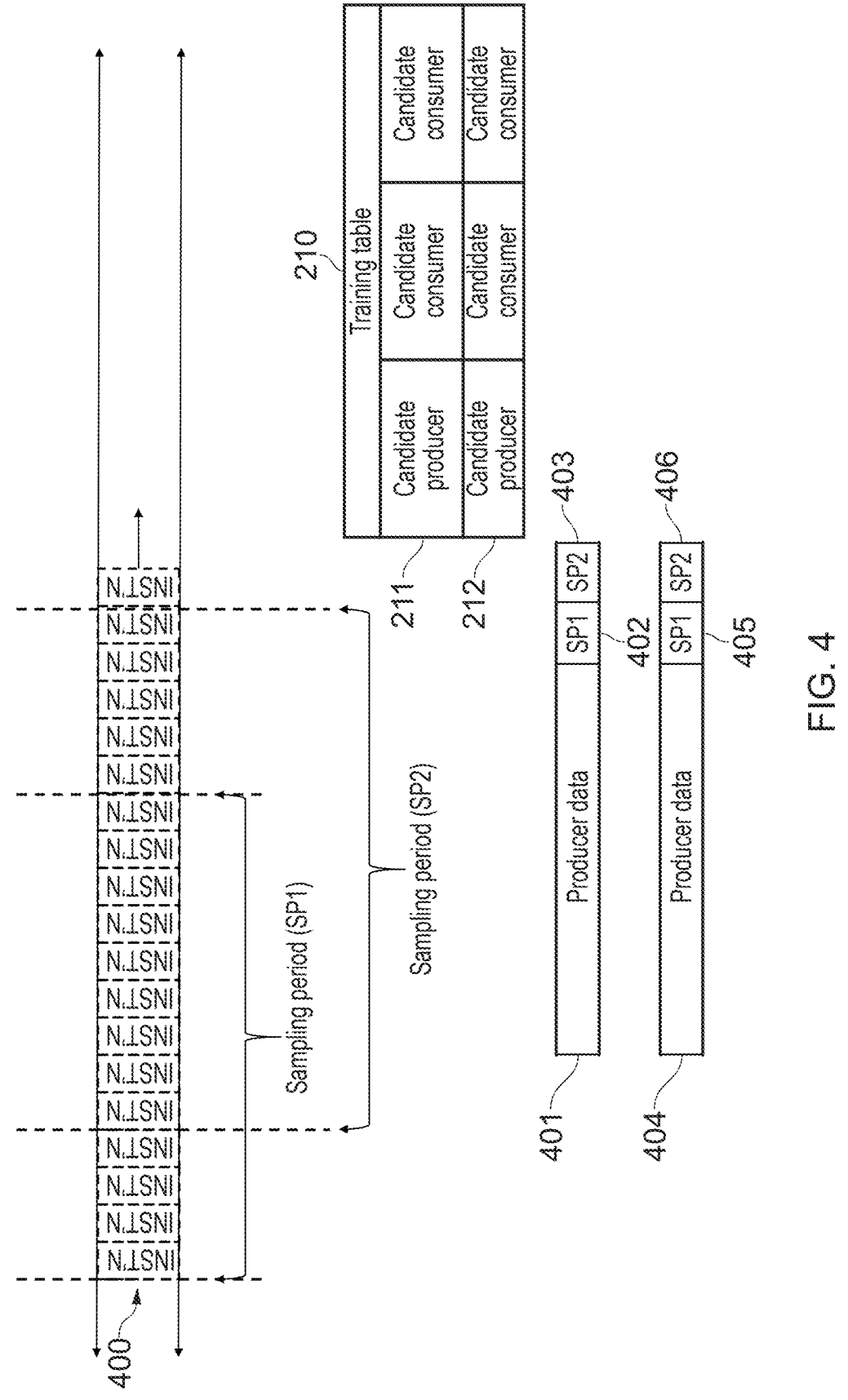
FIG. 4 schematically illustrates two sampling periods in accordance with some examples.

FIG. 4 schematically illustrates two sampling periods SP1 and SP2 in accordance with some examples. Sequentially encountered instructions 400 are monitored and a predefined period (e.g. 1024 instructions) forms a sampling period. Candidate producer instructions and subsequent candidate consumer instructions are selected within a given sampling period. Note that in the figure two sampling periods are shown, which (in this particular case) are overlapping. Two sampling periods may: fully overlap (i.e. correspond to an identical set of observed instructions); partially overlap; or not overlap at all. The sampling periods each correspond to one of the training table entries 211, 212 (see also FIG. 2). The figure also shows a first item of example data 401 that has two associated dependency markers 402, 403, and a second item of example data 404 that has two associated dependency markers 405, 406, where the two dependency markers of each correspond respectively to one of the sampling periods. Accordingly without overlap between the sampling periods, a given data item will likely only have one of the two dependency marks set (if at all), although when the sampling periods overlap a given item of data could have both dependency markers set (indicating that it depends on both of the relevant producers).

Figure 5:
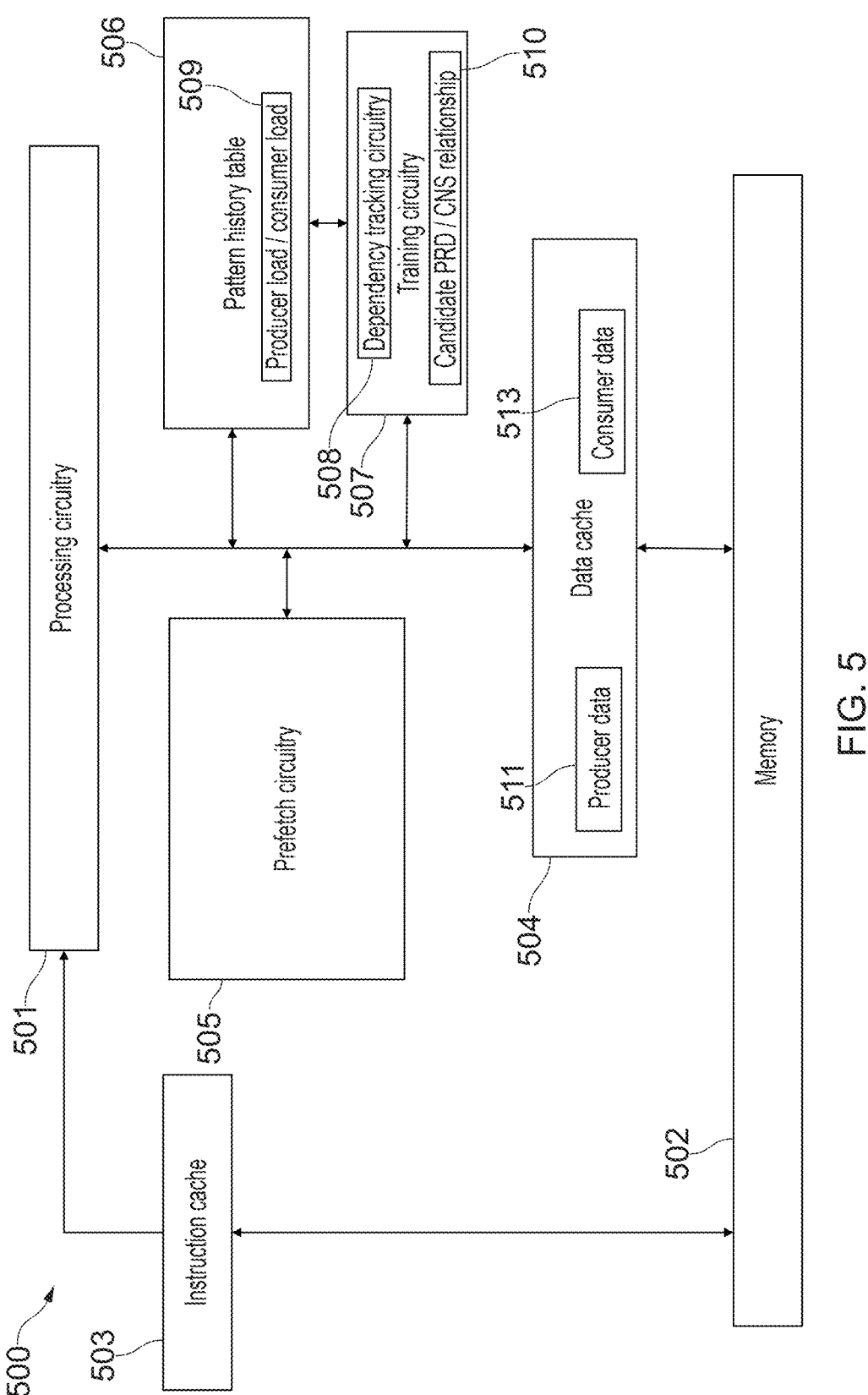
FIG. 5 schematically illustrates a data processing apparatus comprising prefetch circuitry in accordance with some examples.

FIG. 5 schematically illustrates a data processing apparatus 500 comprising prefetch circuitry 505 in accordance with some examples. The apparatus comprises processing circuitry 501, which is arranged to perform data processing operations defined by a sequence of instructions. These instructions are stored in memory 502 and may be temporarily cached in instruction cache 503. Data values that are the subject of the data processing operations are loaded from and stored to the memory 502. These data values may be temporarily cached in data cache 504. As in the example discussed with reference to FIG. 1, in performing the data processing operations various producer-consumer relationships may be encountered. One such type of producer-consumer relationship of relevance to FIG. 5 arises when the producer instruction is a producer load instruction and the at least one consumer instruction is at least one consumer load instruction, whereby a load address of the at least one consumer load instruction is generated in dependence on the producer data retrieved by the producer load instruction. The apparatus further comprises prefetch circuitry 505, which is arranged to initiate prefetches for load instructions that are expected to be encountered in the upcoming sequence of instructions. Data values retrieved by such prefetch operations are stored in the data cache 504, so that when those expected load instructions are indeed encountered the corresponding data values are already available in the data cache, avoiding the latency associated with the performance of the loads. The prefetch circuitry 505 may be configured to identify the prefetches to be performed in any known manner, such as through the use of a stride prefetcher that is arranged to identify regular patterns of loads (such as a sequence of loads from memory addresses with a constant (or at least easily calculable) offset between the memory addresses). Prefetched consumer loads may occur in a number of ways. In some cases, one or more consumer prefetches may be triggered directly from an executed producer load. In other cases, another prefetcher (such as a stride prefetcher) may initiate the prefetch of the producer and subsequently the data from that producer prefetch is used to generate a consumer prefetch. In yet other cases there may be a recursive producer load, which is both a consumer load and a producer load.

The apparatus 500 further comprises training circuitry 507, which is arranged to establish candidate producer-consumer relationships. For this purpose, the training circuitry 507 selects a candidate producer instruction and subsequent candidate consumer instructions from observed instructions in a sampling period, indications of these forming a candidate producer-consumer relationship 510. The training circuitry 507 comprises dependency tracking circuitry 508, which is arranged to set a dependency marker associated with the producer data. When the producer data 511 is required as part of the data processing operations performed by the processing circuitry 501, it is loaded into a register accessible to the processing circuitry (not shown in the figure). Furthermore, because the processing circuitry 501 is configured to propagate the set dependency marker, any result data values generated in the data processing operations in dependence on the producer data 511 will also have the dependency marker set. In order to select candidate consumer instructions in the sampling period the training circuitry 507 is arranged to select as the candidate consumer instructions those instructions for which at least one source operand have a set dependency marker. The candidate producer-consumer relationships established in the sampling period are caused to be stored as an entry 509 in the pattern history table 506. Nevertheless, it is worth noting here that in such examples where load instructions are involved, a configuration may be adopted in which dependency markers are not propagated through load instructions, i.e. a set dependency bit is not propagated through a consumer load from its sources to its destinations. This is because, for a consumer load which is dependent on a producer load's data, it would not be expected that the consumer load's own data has a relationship to the producer load. Accordingly, by not propagating the dependency markers though load instructions, the filtering effectiveness of the dependency marks for other instructions can be better supported. One exception to this non-propagation of the dependency markers is in the case where a load instruction produce an updated value for its base register.

Figures 6A, 6B, 6C:
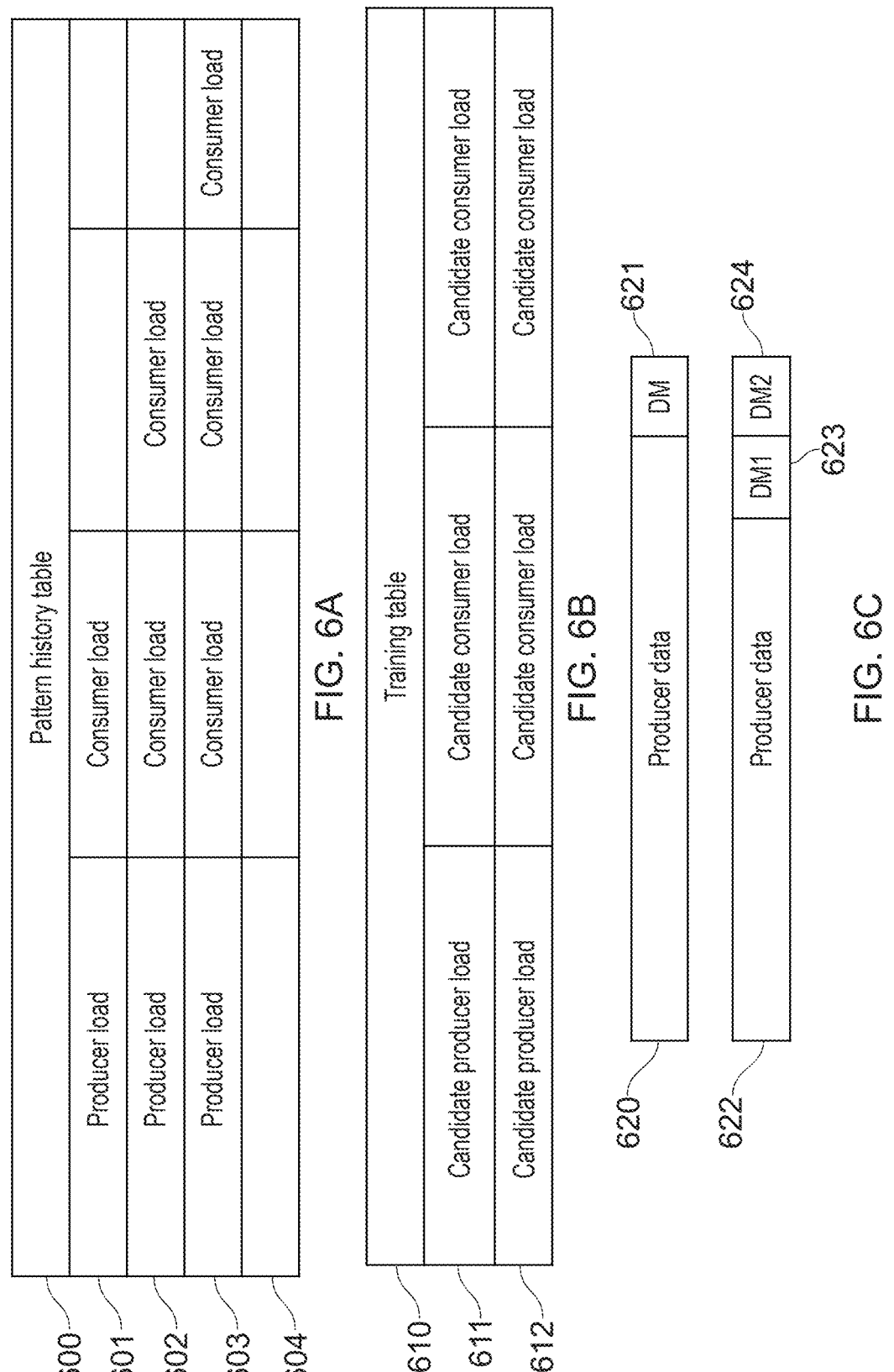
FIG. 6A schematically illustrates an example pattern history table, FIG. 6B schematically illustrates an example training table, and FIG. 6C schematically illustrates example producer data in accordance with some examples.

FIG. 6A schematically illustrates an example pattern history table, FIG. 6B schematically illustrates an example training table, and FIG. 6C schematically illustrates example producer data in accordance with some examples. The pattern history table 600 is arranged to store a producer-consumer relationships. In this example these are relationships between producer loads and consumer loads, for example where the memory address that is accessed by a consumer load is given (directly or indirectly) by the data value loaded by a producer load. These may take the form shown in FIG. 6A where each entry 601, 602, 603, 604 of the pattern history table 600 comprises an indication of a producer load instruction and one or more indications of at least one consumer load instruction. In the example entries shown in FIG. 6A: the entry 601 indicates a relationship between a producer load instruction and a consumer load instruction; the entry 602 indicates a relationship between a producer load instruction and two consumer load instructions; and the entry 603 indicates a relationship between a producer load instruction and three consumer load instructions. The number of consumer load instructions that may be associated with a given producer load instruction is not limited (other than by the storage capacity per entry of the table provided). In FIG. 6B the training table 610 comprises two entries 611, 612 each of which holds a candidate producer load instruction and then, over the course of a sampling period (e.g. 1024 instructions, although the present techniques are not limited to any particular sampling period length), candidate consumer load instructions are selected to form a possible producer-consumer relationship. Example producer data 620, 622 is shown, wherein producer data 620 only has a single associated dependency marker 621, and producer data 622 has two associated dependency markers 623, 624. In some implementations, the training table 610 may comprise only one entry for a candidate producer instruction. In such a case the single dependency marker 621 of producer data 620 can then correspond that that one entry. By contrast, in some implementations (such as that shown in FIG. 6B), the training table 610 comprises two entries 611, 612 each of which holds a candidate producer instruction. The two dependency markers 623, 624 of producer data 622 may then each correspond to a respective one of the two candidate producers in the two entries 611, 612. However, in some implementations the training table 610 may comprises the two entries 611, 612, and yet only the single dependency marker type of producer data 620 is used. This approach may be opted for when the use of the single dependency marker brings sufficient benefit in identifying candidate producer-consumer relationships, even though it does not allow distinction to be made between the respective candidate producer load instructions in the two entries 611, 612 of the training table 610.

Figure 7:
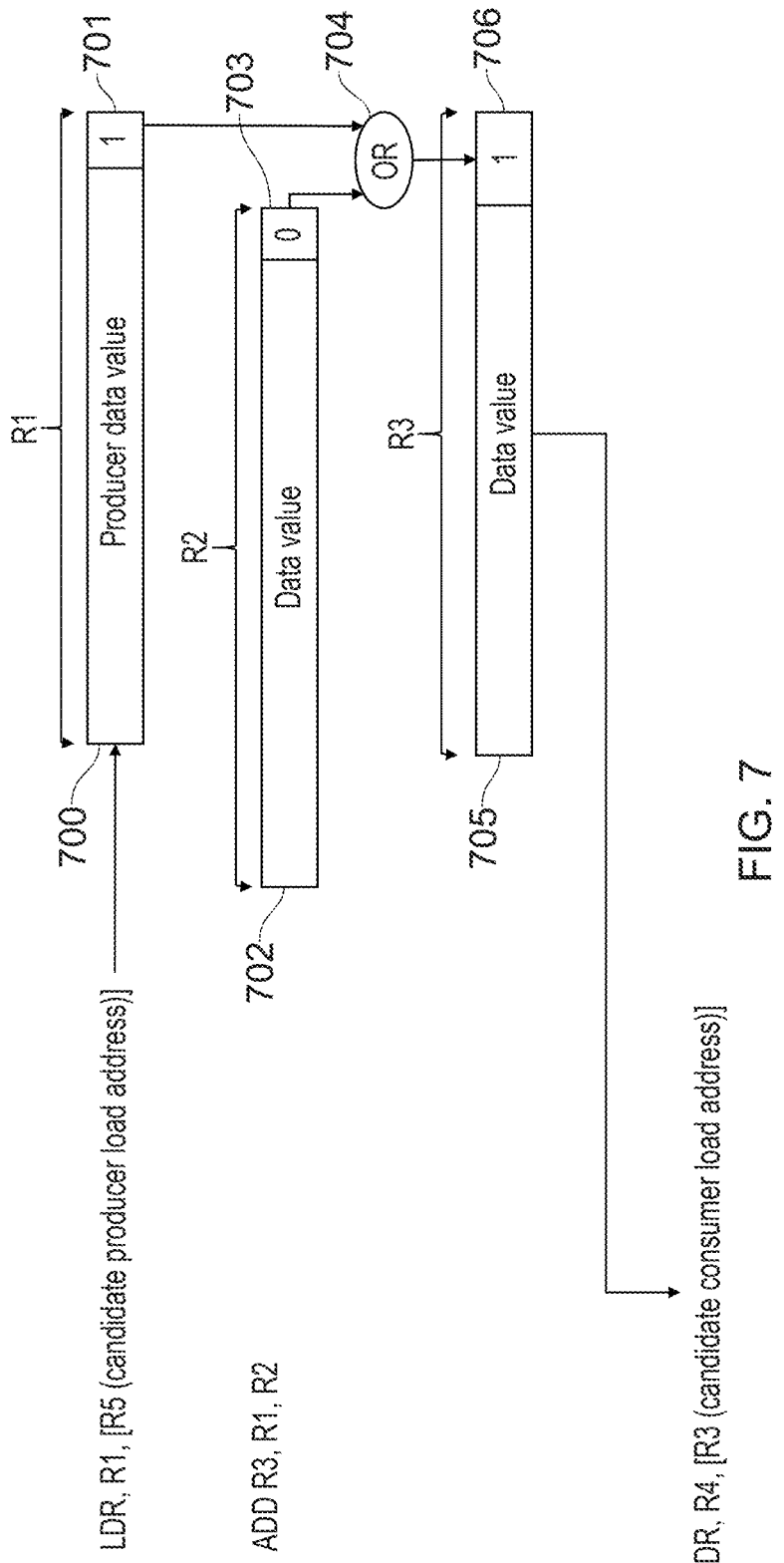
FIG. 7 schematically illustrates the propagation of a dependency marker in accordance with some examples.

FIG. 7 schematically illustrates the propagation of a dependency marker in accordance with some examples. This represents a variant of the example shown in FIG. 3 and a detailed description of each step is dispensed with for brevity. In the example of FIG. 7 it is the execution of a producer load instruction, which specifies a memory address (candidate producer load address), that results in the retrieval of a producer data value 700, which is stored in a destination register R1 with its associated dependency marker 701. Since this is a candidate producer load instruction, its associated dependency marker 701 is set. As shown in the figure, via a similar set of steps as is the case in FIG. 3, the execution of an ADD instruction causes the values held in the source operand registers R1 and R2 to be added together with the result value being stored in the destination register R3. The data value 702 held in register R2 has an associated dependency marker 703, which is not set. The OR function 704 generates the associated dependency marker 706 that accompanies the data value 705 held in destination register R3. The data value 705 then provides the load address for the consumer load instruction.

Figure 8:
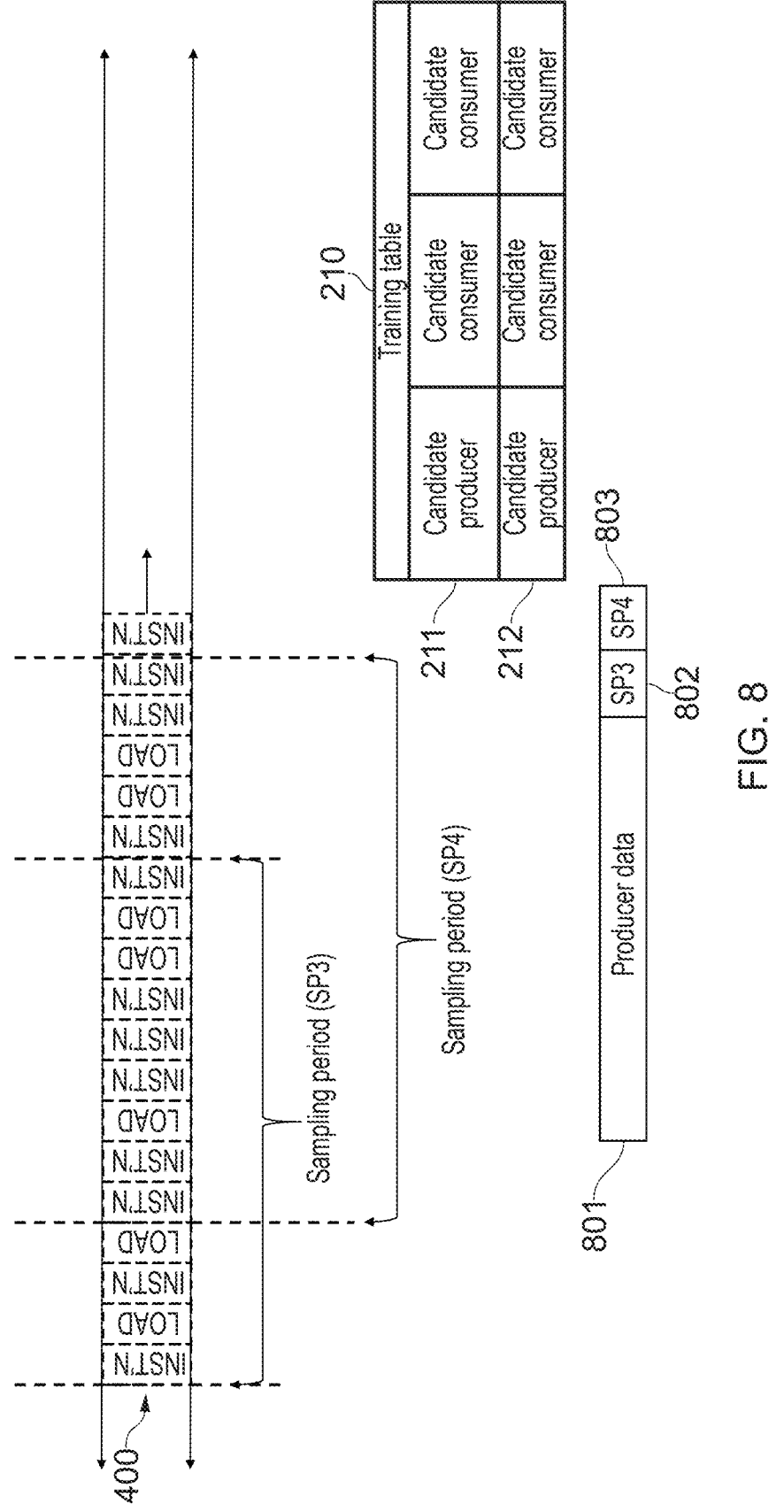
FIG. 8 schematically illustrates two sampling periods in accordance with some examples.

FIG. 8 schematically illustrates two sampling periods SP3 and SP4 in accordance with some examples in a variant on the example of FIG. 4. The sequence of instructions 400 that are monitored comprise load instructions and a predefined period (e.g. 1024 instructions) forms a sampling period. Candidate producer load instructions and subsequent candidate consumer load instructions are selected within a given sampling period. As before for the example of FIG. 4, the two sampling periods are overlapping and sampling periods may: fully overlap; partially overlap; or not overlap at all. The sampling periods each correspond to one of the training table entries 211, 212 (see also FIG. 2). The figure also shows example producer data 801 that has two associated dependency markers 802, 803, where these each correspond respectively to one of the sampling periods.

Figure 9:
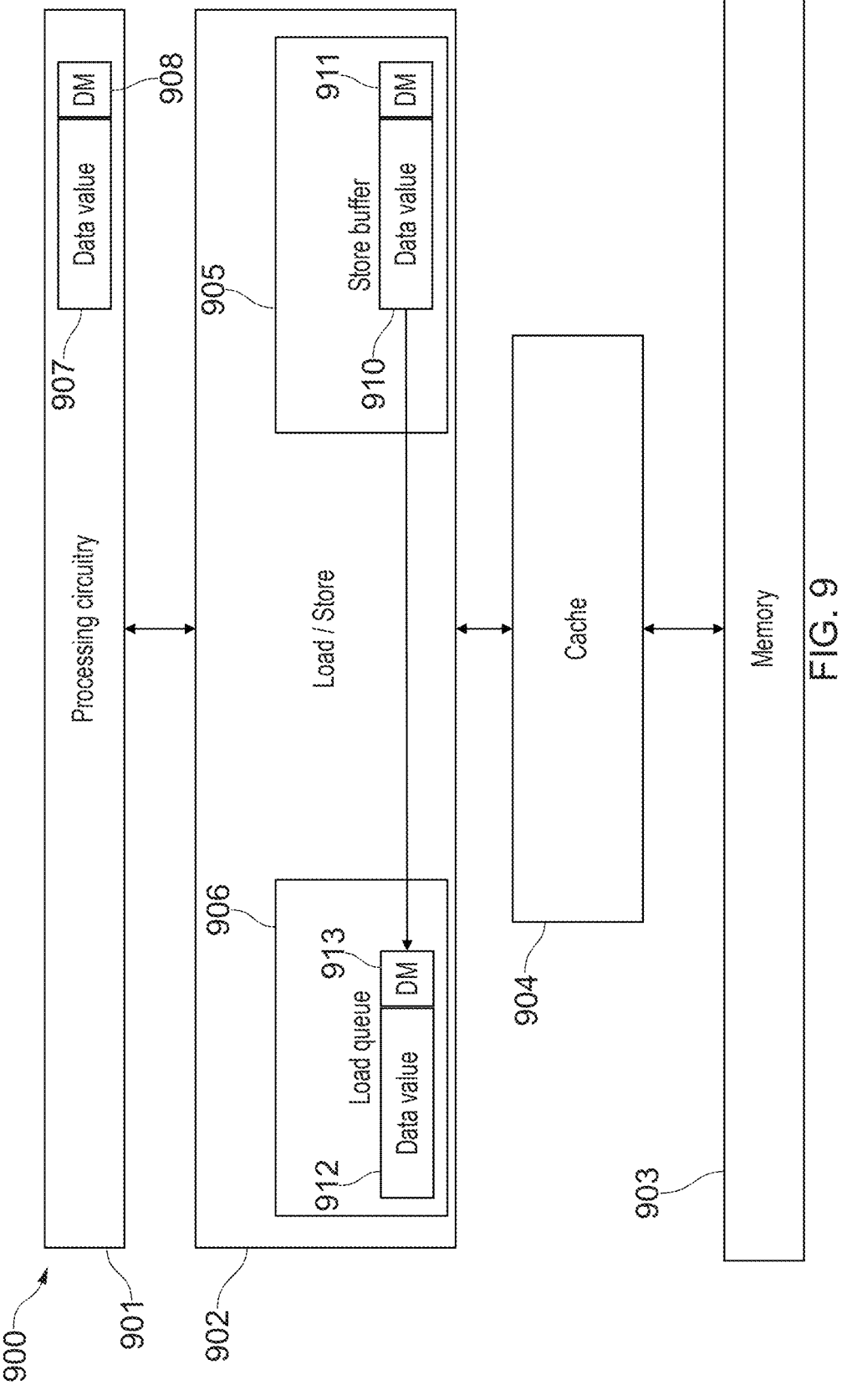
FIG. 9 schematically illustrates a data processing apparatus comprising a load/store unit in accordance with some examples.

FIG. 9 schematically illustrates a data processing apparatus 900 comprising a load/store unit 902 in accordance with some examples. The processing circuitry 901 performs data processing operations specified by a sequence of instructions. These data processing operations comprise the loading of data values from memory 903 and the storing of data values to the memory 903. A cache 904 is also shown as part of the memory system. When the processing circuitry executes a store instruction for a given data value 907 (with an associated dependency marker 908), the resulting store operation is primarily handled by the load/store unit 902. Within the load store unit 902 there is provided a store buffer 905, in which to-be-stored data values are held in a queue, before being passed to the memory system for storage. An example data value 910 (with an associated dependency marker 911) held in the store buffer 905 is shown. The load store unit 902 also comprises a load queue 906. When the processing circuitry executes a load instruction, an entry in the load queue 906 indicates that there is a pending load (whilst the specified memory address is accessed and the data value stored there is retrieved). The load/store unit 902 is arranged to support store-to-load-forwarding, whereby when the processing circuitry executes a load instruction, the load/store unit 902 is arranged to check whether the memory address specified by the load instruction corresponds to the memory address of an entry in the store buffer 905. When this is the case, store-to-load-forwarding enables the data value requested by the load instruction to be provided promptly by provision directly from the store buffer 905 (because this will be the most up-to-date version of that data value), rather than waiting for the data value to be written to memory by the store operation and the retrieved by the load operation. Hence the example data value 912 (with an associated dependency marker 913) in the load queue 906 can be provided in this manner from the store buffer. Note the associated dependency marker is also forwarded, such that the propagation of the dependency marker is also maintained for operations which store then load a data value. Accordingly it is to be noted that although implementations may limit the propagation of the dependency markers to not penetrate the memory system, this is an example of where the propagation need not completely be excluded from all loads, since here the store-to-load-forwarding enables the propagation into the load data.

Figure 10:
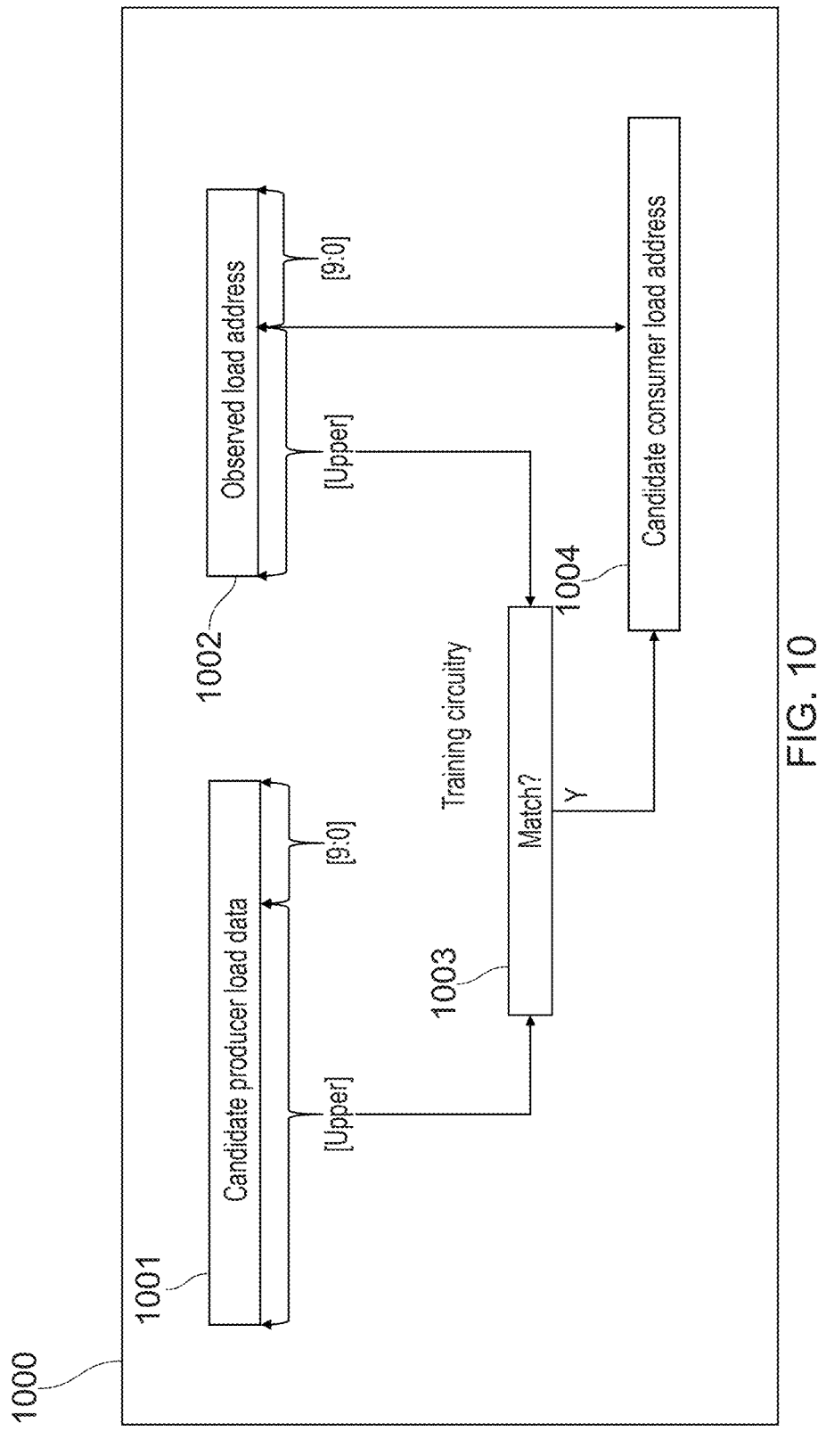
FIG. 10 schematically illustrates the selection of candidate consumer loads in accordance with some examples.

FIG. 10 schematically illustrates the selection of candidate consumer loads in accordance with some examples. Here the load instructions concerned make use of pointers to specify the memory addresses from which data values are to be retrieved. Furthermore, because of the nature of the data processing operations being performed, related producer load data and consumer load instructions are specified by pointers that share the upper bits of their respective values. Accordingly, this fact is made use of here by the training circuitry 1000 as a further filter by which to identify candidate consumer loads. For a selected item of candidate producer load data 1001, the training circuitry is arranged to compare the upper set of bits of the candidate producer load data 1001 with the same portion of a subsequent load address 1002 observed in a sampling period. When these are found to match by comparison circuitry 1003, then the observed load address 1002 may be selected as a candidate consumer load address 1004. Other examples may have a different kind of relationship between the candidate producer load data and the candidate consumer load(s), such as when the producer load retrieves an array index as the producer data, where this array index is then used to determine the candidate consumer load address (for example with reference to an array base address and using an array element size). Such indirection (via the array) would otherwise make the identification of candidate consumer loads for a given candidate producer load very challenging, yet the use of the dependency marker of the present techniques allows the dependency between the two to be identified.

Figure 11:
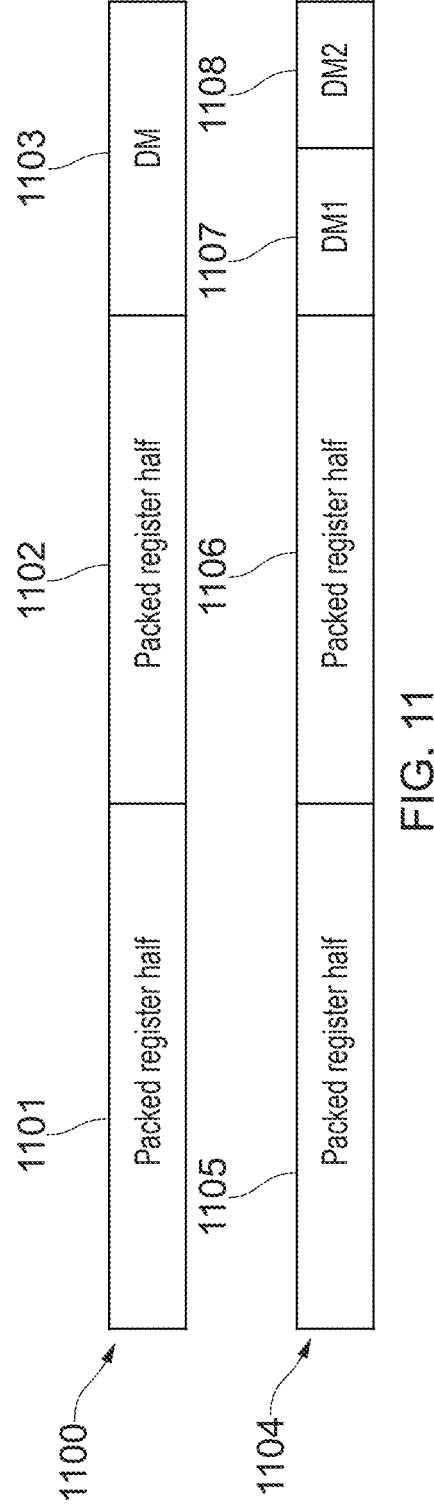
FIG. 11 schematically illustrates the use of dependency markers in packed registers in accordance with some examples.

FIG. 11 schematically illustrates the use of dependency markers in packed registers in accordance with some examples. A first packed register 1100 is shown wherein the two halves of the register 1101, 1102 each independently hold a data value. A dependency marker 1103 is shown which is associated with the register 1100. Where dependency marker 1103 as a single bit value, whilst this marker can be set as described in any of the examples described herein, distinction as to whether the marker has been set in association with the first packed register half 1101 or the second packed register half 1102 is not possible. A second packed register 1104 is shown wherein the two halves of the register 1105, 1106 each independently hold a data value. For this register 1104, two dependency markers 1107, 1108 are provided. In this example, where the dependency markers 1107, 1108 each comprise (at least) a single bit value, the dependency marker 1107 can be associated with the first packed register half 1105 and the dependency marker 1108 can be associated with the second packed register half 1106.

Figure 12:
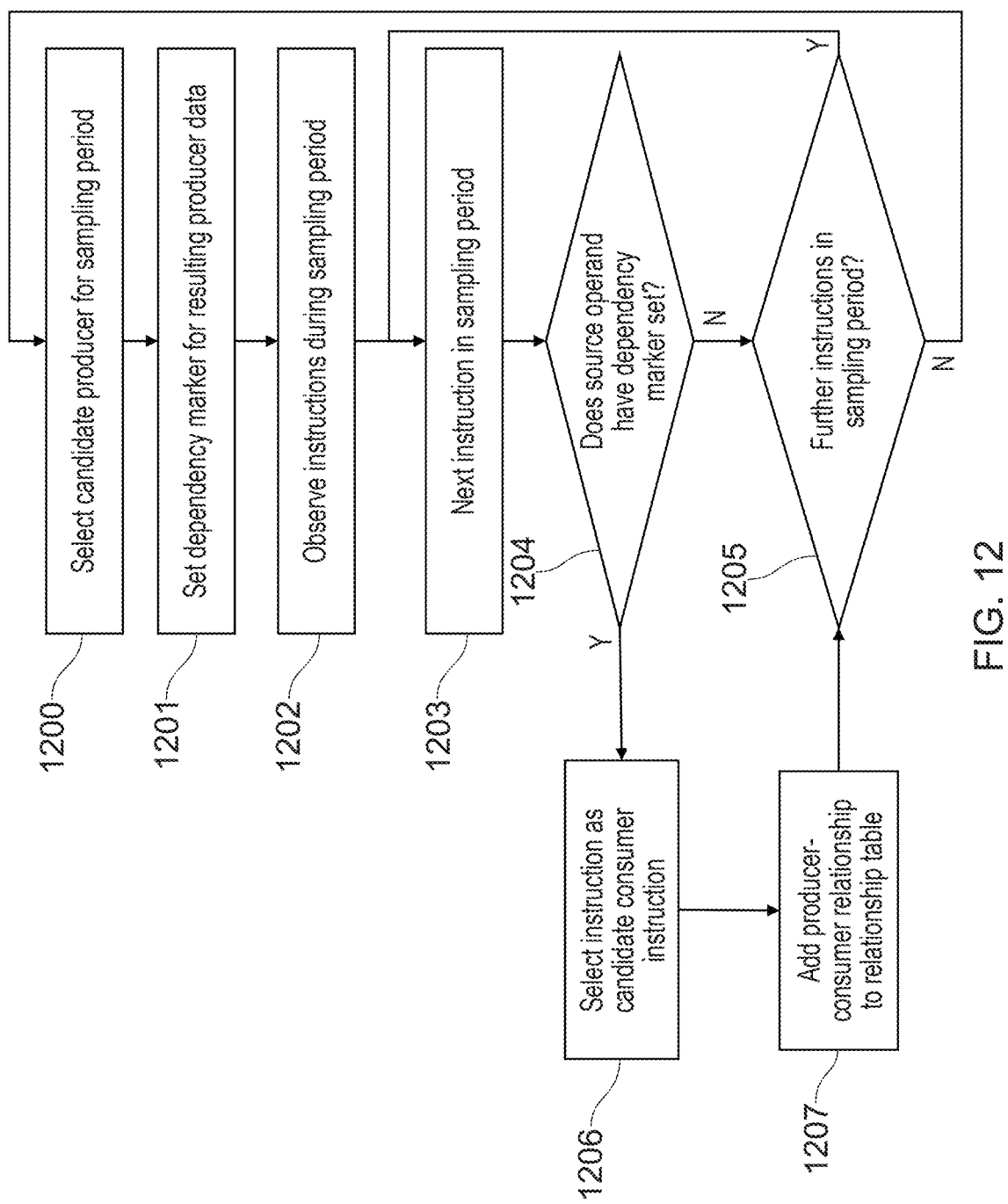
FIG. 12 is a flow diagram schematically illustrating a sequence of steps that are taken in a method in accordance with some examples.

FIG. 12 is a flow diagram schematically illustrating a sequence of steps that are taken in a method in accordance with some examples. The flow can be considered to begin at step 1200, where a candidate producer instruction is selected in a new sampling period. At step 1201, the dependency marker for the resulting producer data from the candidate producer instruction is set. Then at step 1202 instructions are observed during the sampling period, whereby for each instruction in the sampling period (step 1203) it is then determined at step 1204 whether a source operand of that instruction has the dependency marker set. When it does not have the dependency marker set, the flow proceeds to step

1205 at which it is determined whether there are further instructions in the sampling period. When this is not the case the sampling period is concluded and the flow returns to step 1200. Otherwise, at step 1204, when the dependency marker is found to be set in a source operand of the instruction, at step 1206 that instruction is selected as a candidate consumer instruction. At step 1207 a producer-consumer relationship can be added to the relationship table indicating a relationship between the candidate producer instruction and the candidate consumer instruction. The flow then links to step 1205.

FIG. 13A is a flow diagram schematically illustrating a sequence of steps that are taken in a method in accordance with some examples. Here the instructions are load instructions. Hence at the start of the flow, at step 1300, a candidate producer load instruction is selected in a new sampling period. At step 1301, the dependency marker for the retrieved producer data from the candidate producer load instruction is set. Then at step 1302 load instructions are observed during the sampling period, whereby for each load instruction in the sampling period (step 1303) it is determined at step 1304 whether the load address of that instruction has the dependency marker set. When it does not have the dependency marker set, the flow proceeds to step 1305 at which it is determined whether there are further loads in the sampling period. When this is not the case the sampling period is concluded and the flow returns to step 1300. Otherwise, at step 1304, when the dependency marker is found to be set in the load address of the load instruction, at step 1306 that instruction is selected as a candidate consumer load instruction. At step 1307 a producer-consumer relationship can be added to the pattern history table indicating a relationship between the candidate producer load instruction and the candidate consumer load instruction. The flow then links to step 1305.

FIG. 13B is a flow diagram schematically illustrating a sequence of steps that are taken in a method in accordance with some examples. This method describes the operation of prefetch circuitry that makes use of a pattern history table (in which producer-consumer relationships are stored). At step 1310 it is determined whether an observed data load (whether initiated by a load instruction or by a prefetch operation) matches an indication of a producer load in the pattern history table. When this is not the case, the flow loops on itself at step 1310. When such a match is found, at step 1311 it is determined whether the corresponding producer-consumer relationship satisfies a confidence criterion. Producer-consumer relationships that are stored in the pattern history table may initially not meet this confidence criterion, but further observations of this producer-consumer relationships is subsequent sampling periods can be used to increase the confidence in the relationship. When the confidence criterion is not met the flow returns to set 1310. When the confidence criterion is met, at step 1312 the prefetch circuitry initiates a prefetch corresponding to the consumer load associated with the producer load using the producer data to define the memory address to be accessed by the consumer load. The flow then returns to step 1310.

Concepts described herein may be embodied in a system comprising at least one packaged chip. The apparatus and circuitry described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component.

Figure 14:
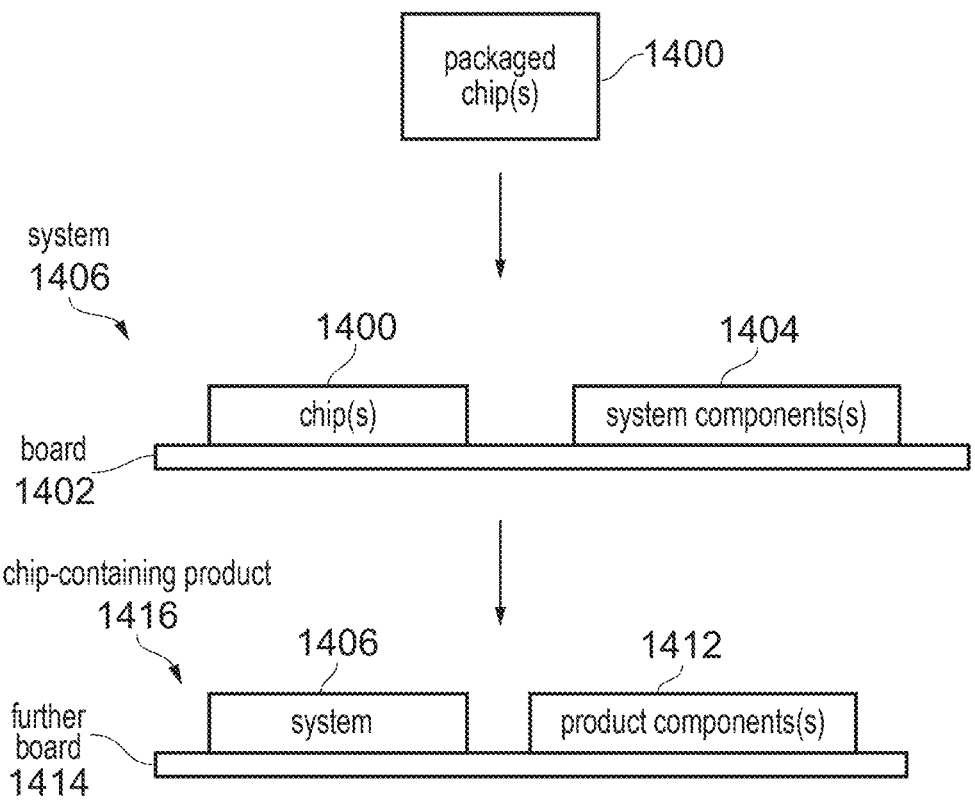
FIG. 14 schematically illustrates a system comprising an implementation in a packaged chip and an implementation in a chip-containing product in accordance with some examples.

The system or the chip-containing product may be assembled into a housing or onto a structural support (such as a frame or blade). FIG. 14 schematically illustrates a system 1406 comprising an implementation in a packaged chip 1400 and an implementation in a chip-containing product 1416 in accordance with some examples. Hence, one or more packaged chips 1400, with the apparatus described above implemented on one chip or distributed over two or more of the chips, are manufactured by a semiconductor chip manufacturer. In some examples, the chip product 1400 made by the semiconductor chip manufacturer may be provided as a semiconductor package which comprises a protective casing (e.g. made of metal, plastic, glass or ceramic) containing the semiconductor devices implementing the apparatus and circuitry described above and connectors, such as lands, balls or pins, for connecting the semiconductor devices to an external environment. Where more than one chip 1400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 1400 are assembled on a board 1402 together with at least one system component 1404 to provide a system 1406. For example, the board may comprise a printed circuit board. The board substrate may be made of any of a variety of materials, e.g. plastic, glass, ceramic, or a flexible substrate material such as paper, plastic or textile material. The at least one system component 1404 comprise one or more external components which are not part of the one or more packaged chip(s) 1400. For example, the at least one system component 1404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 1416 is manufactured comprising the system 1406 (including the board 1402, the one or more chips 1400 and the at least one system component 1404) and one or more product components 1412. The product components 1412 comprise one or more further components which are not part of the system 1406. As a non-exhaustive list of examples, the one or more product components 1412 could include a user input/output device such as a keypad, touch screen, microphone, loudspeaker, display screen, haptic device, etc. ; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 1406 and one or more product components 1412 may be assembled on to a further board 1414.

The board 1402 or the further board 1414 may be provided on or within a device housing or other structural support (e.g. a frame or blade) to provide a product which can be handled by a user and/or is intended for operational use by a person or company. The system 1406 or the chip-containing product 1416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in an apparatus comprising execution (processing) circuitry having one or more vector processing units for performing vector operations on vectors comprising multiple data elements. Execution circuitry having X vector processing units each configured to perform vector operations on Y bit wide vectors, with the respective vector processing units operable in parallel, may be said to have an XxY bit vector datapath. In some embodiments, the execution circuitry is provided having six or more vector processing units. In some embodiments, the execution circuitry is provided having five or fewer vector processing units. In some embodiments, the execution circuitry is provided having two vector processing units (and no more). In some embodiments, the one or more vector processing units are configured to perform vector operations on 128-bit wide vectors. In some embodiments, the execution circuitry has a 2×128 bit vector datapath. Alternatively, in some embodiments the execution circuitry has a 6×128 bit vector datapath.

Concepts described herein may be embodied in an apparatus comprising a level one data (L1D) cache. The L1D cache is a private cache associated with a given processing element (e.g. a central processing unit (CPU) or graphics processing element (GPU)). In a cache hierarchy of multiple caches capable of caching data accessible by load/store operations processed by the given processing element, the L1D cache is a level of cache in the hierarchy which is faster to access than a level two (L2) cache. In some embodiments, the L1 data cache is the fastest to access is the hierarchy, although even faster to access caches, for example, level zero (L0) caches may also be provided. If a load/store operation hits in the L1D cache, it can be serviced with lower latency than if it misses in the L1D cache and is serviced based on data in a subsequent level of cache or in memory. In some embodiments, the L1D cache comprises storage capacity of less than 96 KB, in one example the L1D cache is a 64 KB cache. In some embodiments, the L1D cache comprises storage capacity of greater than or equal to 96 KB, in one example the L1D cache is a 128 KB cache.

Concepts described herein may be embodied in an apparatus comprising a level two (L2) cache. The L2 cache for a given processing element is a level of cache in the cache hierarchy that, among caches capable of holding data accessible to load/store operations, is next fastest to access after the L1D cache. The L2 cache can be looked up in response to a load/store operation missing in the L1D cache or an instruction fetch missing in an L1 instruction cache. In some embodiments, the L2 cache comprises storage capacity of less than 1536 KB (1.5 MB), in one example the L2 cache is a 1024 KB (1 MB) cache. In some embodiments, the L2 cache comprises storage capacity greater than or equal to 1536 KB and less than 2560 KB (2.5 MB), in one example the L2 cache is a 2048 KB (2 MB) cache. In some embodiments, the L2 cache comprises storage capacity greater than or equal to 2560 KB, in one example the L2 cache is a 3072 KB (3 MB) cache. In some embodiments, the L2 cache has a larger storage capacity than the L1D cache.

Figure 15:
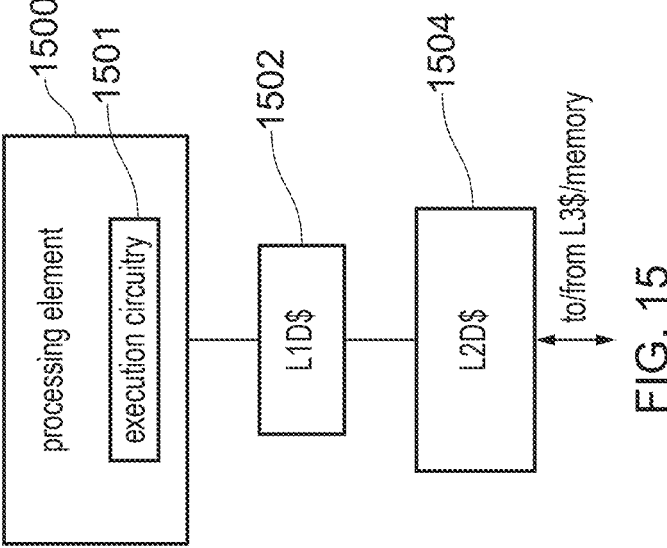
FIG. 15 schematically illustrates a processing element in accordance with some examples.

FIG. 15 illustrates an example of an apparatus comprising a processing element 1500 (e.g. a CPU or GPU) comprising execution (processing) circuitry 1501 for executing processing operations in response to decoded program instructions. The processing element 1500 has access to a L1D cache 1502 and a L2 cache 1504, which are part of a cache hierarchy of multiple caches for caching data from memory that is accessible by the processing element 1500 in response to load/store operations executed by the execution circuitry 1501. Thus the processing element 1500 may further comprises the components set out above in any of the described example apparatuses and the processing element 1500 is configured to propagate dependency markers as described herein.

Figure 16:
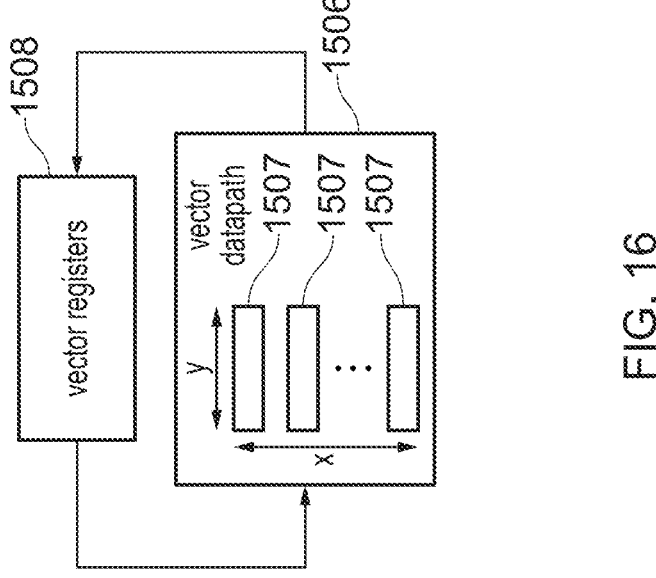
FIG. 16 schematically illustrates a vector datapath in accordance with some examples.

FIG. 16 illustrates an example of a vector datapath 1506 that may be provided as part of the execution circuitry 1501 of the processing element 1500, and vector registers 1508 for storing vector operands for processing by the vector datapath 1506. Vector operands read from the vector registers 1508 are processed by the vector datapath 1506 to generate vector results which may be written back to the vector registers 1508. The vector datapath 1506 is an XxY bit vector datapath, comprising X vector processing units 1507 each configured to perform vector operations on Y bit vectors. The vector registers 1508 may be accessible as Z bit vector registers, where Z can be equal to Y or different to Y. For a vector operation requiring a Z-bit vector operand where Z is greater than Y, the Z-bit vector operand can be processed using two or more vector processing units 1507 operating in parallel on different portions of the Z-bit vector operand in the same cycle and/or using multiple passes through the vector datapath in two or more cycles. For vector operations requiring a Z-bit vector operand where Z is less than Y, a given vector processing unit 1507 can process two or more vectors in parallel.

Various example configurations are set out in the following numbered clauses:

Clause 1. A data processing apparatus comprising:

processing circuitry to perform data processing operations by executing instructions;

a relationship table to store a plurality of producer-consumer relationships, each producer-consumer relationship defining an association between a producer instruction and at least one consumer instruction, wherein a source operand of the at least one consumer instruction is generated in dependence on producer data resulting from the producer instruction;

training circuitry to select a candidate producer instruction from a plurality of observed instructions in a sampling period to evaluate a candidate producer-consumer relationship between the candidate producer instruction and subsequent candidate consumer instructions in the plurality of observed instructions and to cause the candidate producer-consumer relationship to be stored in the relationship table; and dependency tracking circuitry responsive to provision of the producer data to set a dependency marker associated with the producer data and wherein the processing circuitry is configured to propagate the dependency marker that is set to be associated with result data values generated in the data processing operations in dependence on the producer data, wherein the training circuitry is configured to select for the subsequent candidate consumer instructions in the sampling period an observed instruction for which at least one source operand has the dependency marker that is set.

Clause 2. The data processing apparatus of Clause 1, wherein the training circuitry comprises a training table with multiple entries and an entry of the training table holds an indication of the candidate producer instruction, and the training circuitry is configured to select for each entry of the multiple entries a respective candidate producer instruction and to evaluate a respective candidate producer-consumer relationship between the respective candidate producer instruction and subsequent respective candidate consumer instructions in the plurality of observed instructions.

Clause 3. The data processing apparatus of Clause 2, wherein the dependency marker is a respective dependency marker of multiple dependency markers in a dependency vector associated with the producer data, the dependency vector corresponding to the multiple entries of the training table.

Clause 4. The data processing apparatus of any of Clauses 1-3, wherein the processing circuitry is configured, when executing an instruction as part of the executing instructions, to generate the dependency marker for a result value as one of:

an OR function of the dependency markers for source operands of the instruction;

an XOR function of the dependency markers for source operands of the instruction.

Clause 5. The data processing apparatus of any of Clauses 1-4, wherein the training circuitry is configured to select the candidate producer instruction from a plurality of observed instructions in a sampling period and is configured to select the observed instruction for which at least one source operand has the dependency marker that is set in the sampling period.

Clause 6. The data processing apparatus of any of Clauses 1-5, wherein the training circuitry is configured, after the sampling period, to commence a new sampling period without causing the dependency marker to be cleared.

Clause 7. The data processing apparatus of any of Clauses 1-5, wherein the training circuitry is configured, after the sampling period, to cause the dependency marker to be cleared before commencing a new sampling period.

Clause 8. The data processing apparatus of any of Clauses 1-7, wherein the dependency marker is a sequence dependency marker of multiple sequence dependency markers associated with the producer data, wherein the sequence dependency marker is associated with the sampling period and a subsequent sequence dependency marker of the multiple sequence dependency markers is associated with a subsequent sampling period.

Clause 9. The data processing apparatus of any of Clauses 1-8, wherein the training circuitry is configured to select as the candidate producer instruction a predetermined type of instruction and is configured to select the observed instruction for which at least one source operand has the dependency marker that is set from a set of observed instructions that follows the candidate producer instruction.

Clause 10. The data processing apparatus of any of clauses 1-8, wherein the producer instruction is a producer load instruction and the at least one consumer instruction is at least one consumer load instruction, wherein a load address of the at least one consumer load instruction is generated in dependence on the producer data retrieved by the producer load instruction.

Clause 11. The data processing apparatus of Clause 10, further comprising:

a cache to store local copies of data items for use in the data processing operations; and prefetch circuitry to initiate a prefetch of data for storage in the cache and, when an observed data load matches the producer load of an identified producer-consumer relationship in the relationship table, to initiate the prefetch for the at least one consumer load in dependence on the identified producer-consumer relationship and the producer data from the observed data load to return respective consumer data for storage in the data cache.

Clause 12. The data processing apparatus of Clause 11, wherein a confidence value is associated with each producer-consumer relationship stored in the relationship table, wherein the training circuitry is configured to update the confidence value associated with each said producer-consumer relationship in iterations over multiple sampling periods, and wherein initiation of the prefetch for the at least one consumer load in dependence on the identified producer-consumer relationship requires the confidence value associated with the identified producer-consumer relationship to meet a threshold value.

Clause 13. The data processing apparatus of any of Clauses 1-12, further comprising a store buffer to hold queued data values generated in the data processing operations before the queued data values are passed to a memory system, wherein propagation of the dependency marker further comprises associating the dependency marker with a queued data value held in the store buffer and, when the queued data value becomes a loaded data value via store-to-load-forwarding, propagating the dependency marker to the loaded data value.

Clause 14. The data processing apparatus of any of Clauses 10-13, wherein the producer data comprises a pointer indicative of the load address of the at least one consumer load.

Clause 15. The data processing apparatus of Clause 14, wherein the training circuitry is configured to select the subsequent candidate consumer instructions in the sampling period in further dependence on a limit in address space difference between the candidate producer load data and the candidate consumer loads.

Clause 16. The data processing apparatus of any of
Clauses 1-13,
    wherein the producer data comprises an array index.
Clause 17. The data processing apparatus of any of
Clauses 1-16,
    further comprising register storage associated with the
        processing circuitry, wherein registers of the register
        storage hold data values providing source operands
        of the instructions executed by the processing cir-
        cuitry when performing the data processing opera-
        tions,
    wherein the registers each have a predetermined data
        size, and wherein the data processing apparatus is
        configured to use the registers as packed registers,
        wherein multiple data values are held in one packed
        register,
    and wherein the dependency tracking circuitry is con-
        figured to cause the dependency marker associated
        with a packed register to be set when one of the
        multiple data values held in the packed register is a
        result data value generated in the data processing
        operations in dependence on the producer data.
Clause 18. The data processing apparatus of Clause 17,
    wherein the dependency marker is a respective depen-
        dency marker of multiple dependency markers in a
        dependency vector associated with the producer
        data, the dependency vector corresponding to the
        multiple entries of the training table,
    wherein the dependency vector is associated with the
        packed register and the respective dependency mark-
        ers of the multiple dependency markers correspond
        to the multiple data values held in the packed reg-
        ister.
Clause 19. A system comprising:
    the apparatus of any of Clauses 1-18, implemented in
        at least one packaged chip;
    at least one system component; and
    a board, wherein the at least one packaged chip and the
        at least one system component are assembled on the
        board.
Clause 20. A chip-containing product comprising the
    system of Clause 19 assembled on a further board with
    at least one other product component.
Clause 21. A method of data processing comprising:
    performing data processing operations by executing
        instructions;
    storing in a relationship table a plurality of producer-
        consumer relationships, each producer-consumer
        relationship defining an association between a pro-
        ducer instruction and at least one consumer instruc-
        tion, wherein a source operand of the at least one
        consumer instruction is generated in dependence on
        producer data resulting from the producer instruc-
        tion;
    selecting a candidate producer instruction;
    evaluating a candidate producer-consumer relationship
        between the candidate producer instruction and sub-
        sequent candidate consumer instructions in a plural-
        ity of observed instructions and causing the candi-
        date producer-consumer relationship to be stored in
        the relationship table;
    in response to provision of the producer data setting a
        dependency marker associated with the producer
        data;

propagating the dependency marker that is set to be
        associated with result data values generated in the
        data processing operations in dependence on the
        producer data; and
    selecting for the subsequent candidate consumer
        instructions an observed instruction for which at
        least one source operand has the dependency marker
        that is set.
Clause 22. The data processing apparatus of any of
    Clauses 1-18, wherein the processing circuitry com-
    prises a 6×128 bit vector datapath.
Clause 23. The data processing apparatus of any of
    Clauses 10-12, wherein the processing circuitry is
    configured not to propagate the dependency marker that
    is set to be associated with result data values generated
    in the data processing operations in dependence on the
    producer data, when the consumer instruction is a load
    instruction.
    In brief overall summary a relationship table stores a
plurality of producer-consumer relationships defining asso-
ciations between producers and consumers, wherein a
source operand of a consumer is generated in dependence on
producer data resulting from the producer. A candidate
producer is selected and, based on subsequent candidate
consumers, a candidate producer-consumer relationship is
established and stored in the relationship table. A depen-
dency marker is set in association with the producer data and
a set dependency marker is propagated so as to be associated
with result data values generated in data processing opera-
tions in dependence on the producer data. Candidate con-
sumers are selected when they have at least one source
operand that has a set dependency marker.
    In the present application, the words "configured to . . . "
are used to mean that an element of an apparatus has a
configuration able to carry out the defined operation. In this
context, a "configuration" means an arrangement or manner
of interconnection of hardware or software. For example, the
apparatus may have dedicated hardware which provides the
defined operation, or a processor or other processing device
may be programmed to perform the function. "Configured
to" does not imply that the apparatus element needs to be
changed in any way in order to provide the defined opera-
tion.
    Although illustrative embodiments of the invention have
been described in detail herein with reference to the accom-
panying drawings, it is to be understood that the invention
is not limited to those precise embodiments, and that various
changes, additions and modifications can be effected therein
by one skilled in the art without departing from the scope of
the invention as defined by the appended claims. For
example, various combinations of the features of the depen-
dent claims could be made with the features of the indepen-
dent claims without departing from the scope of the present
invention.
    We claim:
    1. A data processing apparatus comprising:
    processing circuitry configured to perform data process-
        ing operations by executing instructions;
    a relationship table configured to store a plurality of
        producer-consumer relationships, each producer-con-
        sumer relationship defining an association between a
        producer instruction and at least one consumer instruc-
        tion, wherein a source operand of the at least one
        consumer instruction is generated in dependence on
        producer data resulting from the producer instruction;
    training circuitry configured to select a candidate pro-
        ducer instruction and to evaluate a candidate producer-consumer relationship between the candidate producer instruction and subsequent candidate consumer instructions in a plurality of observed instructions and to cause the candidate producer-consumer relationship to be stored in the relationship table; and dependency tracking circuitry responsive to provision of the producer data to set a dependency marker associated with the producer data and wherein the processing circuitry is configured to propagate the dependency marker that is set to be associated with result data values generated in the data processing operations in dependence on the producer data, wherein the training circuitry is configured to select for the subsequent candidate consumer instructions an observed instruction for which at least one source operand has the dependency marker that is set, wherein the training circuitry is configured to select the candidate producer instruction from a plurality of observed instructions in a sampling period and is configured to select the observed instruction for which at least one source operand has the dependency marker that is set in the sampling period.

2. The data processing apparatus of claim 1, wherein the training circuitry comprises a training table with multiple entries and an entry of the training table holds an indication of the candidate producer instruction, and the training circuitry is configured to select for each entry of the multiple entries a respective candidate producer instruction and to evaluate a respective candidate producer-consumer relationship between the respective candidate producer instruction and subsequent respective candidate consumer instructions in the plurality of observed instructions.

3. The data processing apparatus of claim 2, wherein the dependency marker is a respective dependency marker of multiple dependency markers in a dependency vector associated with the producer data, the dependency vector corresponding to the multiple entries of the training table.

4. The data processing apparatus of claim 1, wherein the processing circuitry is configured, when executing an instruction as part of the executing instructions, to generate the dependency marker for a result value as one of:

an OR function of the dependency markers for source operands of the instruction;

an XOR function of the dependency markers for source operands of the instruction.

5. The data processing apparatus of claim 1, wherein the training circuitry is configured, after the sampling period, to commence a new sampling period without causing the dependency marker to be cleared.

6. The data processing apparatus of claim 1, wherein the training circuitry is configured, after the sampling period, to cause the dependency marker to be cleared before commencing a new sampling period.

7. The data processing apparatus of claim 1, wherein the dependency marker is a sequence dependency marker of multiple sequence dependency markers associated with the producer data, wherein the sequence dependency marker is associated with the sampling period and a subsequent sequence dependency marker of the multiple sequence dependency markers is associated with a subsequent sampling period.

8. The data processing apparatus of claim 1, wherein the training circuitry is configured to select as the candidate producer instruction a predetermined type of instruction and is configured to select the observed instruction for which at least one source operand has the dependency marker that is set from a set of observed instructions that follows the candidate producer instruction.

9. The data processing apparatus of claim 1, wherein the producer instruction is a producer load instruction and the at least one consumer instruction is at least one consumer load instruction, wherein a load address of the at least one consumer load instruction is generated in dependence on the producer data retrieved by the producer load instruction.

10. The data processing apparatus of claim 9, further comprising:

a cache configured to store local copies of data items for use in the data processing operations; and prefetch circuitry configured to initiate a prefetch of data for storage in the cache and, when an observed data load matches the producer load of an identified producer-consumer relationship in the relationship table, to initiate the prefetch for the at least one consumer load in dependence on the identified producer-consumer relationship and the producer data from the observed data load to return respective consumer data for storage in the data cache.

11. The data processing apparatus of claim 10, wherein a confidence value is associated with each producer-consumer relationship stored in the relationship table, wherein the training circuitry is configured to update the confidence value associated with each said producer-consumer relationship in iterations over multiple sampling periods, and wherein initiation of the prefetch for the at least one consumer load in dependence on the identified producer-consumer relationship requires the confidence value associated with the identified producer-consumer relationship to meet a threshold value.

12. The data processing apparatus of claim 9, wherein the producer data comprises a pointer indicative of the load address of the at least one consumer load.

13. The data processing apparatus of claim 1, further comprising a store buffer configured to hold queued data values generated in the data processing operations before the queued data values are passed to a memory system, wherein propagation of the dependency marker further comprises associating the dependency marker with a queued data value held in the store buffer and, when the queued data value becomes a loaded data value via store-to-load-forwarding, propagating the dependency marker to the loaded data value.

14. The data processing apparatus of claim 1, wherein the producer data comprises an array index.

15. The data processing apparatus of claim 1, further comprising register storage associated with the processing circuitry, wherein registers of the register storage hold data values providing source operands of the instructions executed by the processing circuitry when performing the data processing operations, wherein the registers each have a predetermined data size, and wherein the data processing apparatus is configured to use the registers as packed registers, wherein multiple data values are held in one packed register, and wherein the dependency tracking circuitry is configured to cause the dependency marker associated with a packed register to be set when one of the multiple data values held in the packed register is a result data value generated in the data processing operations in dependence on the producer data.

16. A system comprising:

the apparatus of claim 1, implemented in at least one packaged chip;

at least one system component; and a board, wherein the at least one packaged chip and the at least one system component are assembled on the board.

17. A chip-containing product comprising the system of claim 16 assembled on a further board with at least one other product component.

18. A method of data processing comprising:

performing data processing operations by executing instructions;

storing in a relationship table a plurality of producer-consumer relationships, each producer-consumer relationship defining an association between a producer instruction and at least one consumer instruction, wherein a source operand of the at least one consumer instruction is generated in dependence on producer data resulting from the producer instruction;

selecting a candidate producer instruction;

evaluating a candidate producer-consumer relationship between the candidate producer instruction and subsequent candidate consumer instructions in a plurality of observed instructions and causing the candidate producer-consumer relationship to be stored in the relationship table;

in response to provision of the producer data setting a dependency marker associated with the producer data;

propagating the dependency marker that is set to be associated with result data values generated in the data processing operations in dependence on the producer data;

selecting for the subsequent candidate consumer instructions in the sampling period an observed instruction for which at least one source operand has the dependency marker that is set; and selecting the candidate producer instruction from a plurality of observed instructions in a sampling period and selecting the observed instruction for which at least one source operand has the dependency marker that is set in the sampling period.

19. The data processing apparatus of claim 1, wherein the processing circuitry comprises a 6×128 bit vector datapath.

* * * * *